US007626117B2

(12) United States Patent
Marsan et al.

(10) Patent No.: US 7,626,117 B2
(45) Date of Patent: Dec. 1, 2009

(54) ELECTRODE HAVING A COS LAYER THEREON, PROCESS OR PREPARATION AND USES THEREOF

(76) Inventors: Benoît Marsan, 962 Ringuet, Sainte-Julie, Québec (CA) J3E 1R1; Bernard Bourguignon, 519 des Narcisses, Laval, Québec (CA) H7X 3Z1

( * ) Notice: Subject to any disclaimer, the term of this patent is extended or adjusted under 35 U.S.C. 154(b) by 758 days.

(21) Appl. No.: 10/970,982

(22) Filed: Oct. 25, 2004

(65) Prior Publication Data
US 2005/0089681 A1 Apr. 28, 2005

Related U.S. Application Data

(60) Provisional application No. 60/513,211, filed on Oct. 23, 2003, provisional application No. 60/570,074, filed on May 12, 2004.

(51) Int. Cl.
*H01L 31/00* (2006.01)
(52) U.S. Cl. ......... 136/256; 429/209; 429/111; 429/231.1; 429/231.3
(58) Field of Classification Search ......... 136/256; 429/209, 111, 231.1, 231.3
See application file for complete search history.

(56) References Cited

U.S. PATENT DOCUMENTS 4,421,835 A 12/1983 Manassen et al.
4,828,942 A 5/1989 Licht
5,648,183 A 7/1997 Licht et al.
6,372,829 B1 * 4/2002 Lamanna et al. ............ 524/99
2002/0040728 A1 * 4/2002 Yoshikawa .................. 136/263

OTHER PUBLICATIONS

B. Bourguignon and B. Marsan, Characterization of CoS Deposited as a Thin Film on an ITO Conductive Glass Electrode to Enhance the Energy Conversion Efficiency of an Electrochemical Photovoltaic Cell, 2000, 83rd CSC Conference.*
Gerisher et al., On the Power-Characteristics of Electrochemical Solar Cells, *Ber. Bunsenges Ohys. Chem.*, 80, 327-330 (1976).
Ellis et al., Visible Light to Electrical Energy Conversion. Stable Cadmium Sulfide and Cadmium Selenide Photoelectrodes in Aqueous Electrolytes, *J. Am. Chem. Soc.*, 98, 1635-1637 (1976).
Skotheim et al., A tandem photovoltaic cell using a thin-film polymer electrolyte, *Appl. Phys. Lett.*, 38, 712-714 (1981).
Skotheim et al., Polypyrrole Electrodes, Charge Transfer to Aqueous and Solid Polymer Electrolytes, *Journal de Physique*, C3, 615-620 (1983).

(Continued)

*Primary Examiner*—Alexa D Neckel
*Assistant Examiner*—Xiuyu Tai
(74) *Attorney, Agent, or Firm*—Bereskin & Parr LLP/S.E.N.C.R.L., s.r.l.

(57) ABSTRACT

The present invention relates to an electrode comprising a non-conductive substrate, a first layer and a second layer. The first layer is disposed on the substrate and comprises indium tin oxide or fluorine-doped $SnO_2$. The second layer is disposed on the first layer and comprises CoS. A process for preparing this electrode is also disclosed. Such an electrode is particularly useful in a photovoltaic cell.

56 Claims, 11 Drawing Sheets

OTHER PUBLICATIONS

Skotheim et al., Polymer Solid Electrolyte Photoelectrochemical Cells with n-Si-Polypyrrole Photoelectrodes, *J. Electrochem. Soc.*, 132, 2116-2120 (1985).

Vijh et al., Photoelectrochemical Cells Using Polymer Electrolytes, *Bull. Electrochem.*, 5, 456-461 (1989).

Philias et al., All-solid-state photoelectrochemical cell based on a polymer electrolyte containing a new transparent and highly electropositive redox couple, *Electrochim. Acta*, 44, 2915-2926 (1999).

Philias et al., FTIR spectroscopic study and thermal and electrical properties of polymer electrolytes containing a cesium thiolate/disulfide redox couple, *Electrochim. Acta*, 44, 2351-2363 (1999).

Cao et al., A Solid State, Dye Sensitized Photoelectrochemical Cell, *J. Phys. Chem.*, 99, 17071-17073 (1995).

Mao et al., A Plasticized Polymer-Electrolyte-Based Photoelectrochemical Solar Cell, *J. Electrochem. Soc.*, 145, 121-124 (1998).

Renard et al., Ionic properties of non-aqueous liquid and PVDF-based gel electrolytes containing a cesium thiolate/disulfide redox couple, *Electrochim Acta*, 48/7, 831-844 (2003).

Tenne et al., Catalytic Effect of Metal Ions on the In:$SnO_2$/Aqueous Polysulfide Interface: Application for Polysulfide Based Photoelectrochemical Cells, *Ber. Bunsenges Phys. Chem.*, 92, 42-46 (1988).

Tenne et al., Catalytic effect of heavy metal ions on the $SnO_2$/aqueous polyiodide interface and ist application to photoelectrochemical cells, *J. Electroanal. Chem.*, 269, 389-397 (1989).

Hodes et al., Electrocatalytic Electrodes for the Polysulfide Redox System, *J. Electrochem. Soc.*, 127, 544-549 (1980).

Liu et al., Surface-Modified p-InP Photocathodes in Sulfide/Polysulfide Electrolyte, *J. Electrochem. Soc.*, 129, 1387-1389 (1982).

\* cited by examiner

ELECTRODE HAVING A COS LAYER THEREON, PROCESS OR PREPARATION AND USES THEREOF

CROSS-REFERENCE TO RELATED APPLICATION

The present application claims priority on U.S. provisional application No. 60/513,211 filed on Oct. 23, 2003, and on U.S. provisional application No. 60/570,074 filed on May 12, 2004. The above-mentioned applications are incorporated herein by reference in their entirety.

TECHNICAL FIELD

The present invention relates to improvements in the field of electrochemistry. In particular, this invention relates to a CoS coated electrode and a process for preparing the same.

BACKGROUND OF THE INVENTION

Electrochemical photovoltaic cells (EPC's) are based on a junction between a semiconductor (p-type or n-type) and an electrolyte containing one redox couple; an auxiliary electrode completes the device. If the semiconductor and electrolyte Fermi levels are different and well suited, a built-in potential will develop at their interface and the device will exhibit diode rectification in the dark. When electrons and holes are photogenerated in the vicinity of the junction, the built-in potential permits separation of the charges. If a n-type material is used, holes (valence band) will migrate to the interface and allow oxidation of reduced species contained in the electrolyte. At the same time, photogenerated electrons (conduction band) will migrate toward the bulk of the semiconductor to reach the auxiliary electrode, via an external circuit, where they will reduce the oxidized species of the electrolyte. If a p-type material is used, the processes are reversed: photoelectrochemical reduction at the semiconductor/electrolyte interface, and electrochemical oxidation at the auxiliary electrode/electrolyte interface. As the reactions involve the same redox couple, there is no net chemical change in the electrolyte ($\Delta G=0$) and therefore the effect of the device illumination is to produce a photocurrent and a photovoltage (photovoltaic effect). Such devices can serve as photodiodes (monochromatic light) and as solar cells (white light). The maximum open-circuit photopotential ($V_{oc}$) is determined by the difference between the Fermi level of the semiconductor and that of the electrolyte, the latter being fixed by the redox potential.

EPC's are very attractive for the production of electricity and present a number of advantages over the p-n heterojunctions. The latter generally need a doping step and interdiffusion of majoritary carriers between the p and n regions, whereas the semiconductor/electrolyte junction is simply formed by transfer of majoritary carriers from the semiconductor to the electrolyte, on immersion of the semiconductor into the electrolyte. Among other advantages we can stress: (i) the elimination of light energy losses by absorption in one half of the junction if the electrolyte is colorless; (ii) the possibility of using a thin film polycrystalline semiconductor (much less expensive than a single crystal) with only a small decrease in the cell energy conversion efficiency; (iii) the large number of redox couples (and thus of electrolyte Fermi levels) that can be used to vary the junction built-in potential and hence the device photopotential and photocurrent.

There is extensive prior art on EPC's. The direct conversion of solar energy to electricity by using a semiconductor/electrolyte interface has been demonstrated by H. Gerischer and J. Goberecht in *Ber. Bunsenges Phys. Chem.*, 80, 327 (1976), and by Ellis et al. in *J. Am. Chem. Soc.*, 98, 1635 (1976). The Gerischer cell consisted of a n-CdSe single crystal photoanode and of a doped $SnO_2$ conducting glass cathode dipped in an aqueous alkaline electrolyte containing the $Fe(CN)_6^{4-}/Fe(CN)_6^{3-}$ redox couple. The energy conversion efficiency was 5% but the cell performance decreased rapidly due to decomposition of the illuminated semiconductor electrode. Since that time a major effort has been devoted to the technology of solar energy conversion and to fabrication of various single crystal and polycrystalline semiconductors such as CdS, CdSe, CdTe, $WS_2$, $WSe_2$, $MoS_2$, $MoSe_2$, GaAs, $CuInS_2$, $CuInSe_2$ and $CuIn_{1-x}Ga_xSe_2$. Most of the cells used an aqueous electrolyte (various redox couples were studied: $Fe(CN)_6^{4-}/Fe(CN)_6^{3-}$, $I^-/I_3^-$, $Fe^{2+}/Fe^{3+}$, $S^{2-}/Sn^{2-}$, $Se^{2-}/Se_n^{2-}$, $V^{2+}/V^{3+}$) and systems exhibiting a good energy conversion efficiency were generally unstable under sustained illumination due to a process called photocorrosion. The use of a solvent-free polymer electrolyte could eliminate the photocorrosion process owing to its larger electrochemical stability window and to the low solvation energy for the ions that compose the semiconductor materials. Furthermore, this medium allows the fabrication of compact devices with no leakage of solvent, giving a lower absorption of visible light by the electrolyte. Few EPC's based on the junction between protected n-Si single crystal and poly(ethylene oxide), PEO, complexed with a mixture of KI and $I_2$, were investigated but their stability has not been demonstrated (T. A. Skotheim, *Appl. Phys. Lett.*, 38, 712 (1981), T. A. Skotheim et al. *Journal de Physique*, C3, 615 (1983), T. A. Skotheim and O. Inganäs. *J. Electrochem. Soc.*, 132, 2116 (1985)).

A. K. Vijh and B. Marsan in *Bull. Electrochem.*, 5, 456 (1989) have demonstrated that the all-solid-state EPC's n-CdSe (polycrystalline)∥high molecular weight PEO-based copolymer (noted as modified PEO) complexed with $M_2S/xS$ (M=Li, Na, K; x=1, 3, 5, 7)∥indium tin oxide conducting glass (ITO) are very stable under white light illumination. However, these authors showed that the high series resistance of the cells, mainly attributed to the very low ionic conductivity of the polymer electrolytes, control the device performance.

In order to enhance the conductivity of the solid electrolyte, a cesium thiolate (CsT)/disulfide ($T_2$) redox couple, where $T^-$ stands for 5-mercapto-1-methyltetrazolate ion and $T_2$ for the corresponding disulfide, was dissolved in modified PEO and studied in an EPC (J.-M. Philias and B. Marsan, *Electrochim. Acta*, 44, 2915 (1999)). It was found that the $PEO_{12}$-$CsT/0.1$ $T_2$ electrolyte composition, which is transparent to visible light, exhibits the highest ionic conductivity with $2.5\times10^{-5}$ S $cm^{-1}$ at 25° C. (J.-M. Philias and B. Marsan, *Electrochim. Acta*, 44, 2351 (1999)). Under white light illumination, the cell possesses an energy conversion efficiency (0.11% at 50° C.) about 5 times higher than that of the previous configuration. The lower cell series resistance and the more anodic potential of the $T^-/T_2$ redox couple (0.52 V vs NHE as compared to —0.34 V for the $S_n^{2-}/S_{n+1}^{2-}$ couple) are largely responsible for this improvement. When the EPC is illuminated, thiolate ions ($T^-$) are photooxidized at the n-type semiconductor electrode (forming the S—S bond of the $T_2$ disulfide species) whereas $T_2$ species are reduced at the conducting glass electrode (with cleavage of the S—S bond). Despite this improvement, the conductivity of the solid polymer electrolyte is still too low, particularly at room temperature, and continues to limit the cell performance. EPC's incorporating a much higher conductive gel electrolyte (~$10^{-3}$ S $cm^{-1}$ at 25° C.) were reported in the literature, for example by Cao et al. in *J. Phys. Chem.*, 99, 17071 (1995), and Mao et al.

in *J. Electrochem. Soc.*, 145, 121 (1998). This type of electrolyte consists in the introduction of an aprotic liquid electrolyte in a polymeric matrix. The polymer gives good mechanical properties whereas the liquid electrolyte is responsible for the good conductivity and electrode wetting. Renard et al. in *Electrochim. Acta*, 48/7, 831 (2003) found that the dissolution of the $T^-/T_2$ redox couple in a mixture of DMF and DMSO, and incorporated in poly(vinylidene fluoride), PVdF, gives transparent and highly conductive gel electrolytes (conductivities up to $7 \times 10^{-3}$ S cm$^{-1}$ at 25° C.) with very good mechanical properties. However, when this electrolyte replaced the solid ionic membrane PEO$_{12}$_CsT/0.1 T$_2$ in an EPC, the cell conversion efficiency was not improved.

It has been demonstrated that the cell performance is actually limited by the very slow reduction kinetics of the oxidized species (T$_2$) at the transparent ITO auxiliary electrode and that the difference between oxidation potential of T$^-$ and reduction potential of T$_2$ at this electrode is as large as 3.06 V in a PVdF-based gel electrolyte containing 50 mM CsT and 5 mM T$_2$. Other authors previously reported low cathodic charge transfer between ITO and aqueous polysulfide (S$^{2-}$,S, OH$^-$) (Tenne et al., *Ber. Bunsenges Phys. Chem.*, 92, 42 (1988)) or polyiodide (I$^-$, I$_2$) solutions (Tenne et al., *J. Electroanal. Chem.*, 269, 389 (1989)).

Hodes et al. in *J. Electrochem. Soc.*, 127, 544 (1980) found that the transition metallic sulfides Cu$_2$S and CoS$_x$ act as good electrocatalysts for the polysulfide redox reactions. However, the former is mechanically instable in the electrolyte.

U.S. Pat. No. 4,421,835 describes that cobalt sulphide can be deposited on a conducting substrate such as brass. Such a deposition is carried out by first depositing hydrous cobalt hydroxide and then by converting the latter into cobalt sulphide by treating it with a sulphide solution. However, this document does not teach nor suggest how to deposit cobalt sulphide on a non-conducting substrate.

U.S. Pat. No. 4,828,942 describes a thin cobalt sulphide electrode which can be produced by electrodeposition of cobalt onto a brass foil followed by alternating anodic and cathodic treatment in polysulfide solution. However, this document does not teach nor suggest how to deposit cobalt sulphide on a non-conducting substrate.

U.S. Pat. No. 5,648,183 describes an electrocatalytic electrode comprising a porous material such as cobalt sulphide deposited on a porous nickel or porous brass. However, this document does not teach or suggest how to deposit cobalt sulphide on a non-conducting substrate.

It has been shown that deposited Co(II) species can serve as an electrocatalyst for the reduction of S$_n^{2-}$ ions on ITO electrode (Tenne et al., *Ber. Bunsenges Phys. Chem.*, 92, 42 (1988)) or p-InP photoelectrode (Liu et al., *J. Electrochem. Soc.*, 129, 1387 (1982)).

A method of depositing cobalt sulfide on ITO has been reported by Tenne et al. in *Ber. Bunsenges Phys. Chem.*, 92, 42 (1988). The latter method consists in immersing the substrate for a few minutes in CoCl$_2$ solution ($\geq$0.1 M), rinsing in water and then immersing in a separate polysulfide solution for a few minutes; this process can be repeated several times. However, this technique does not allow an adequate control of the COS film thickness.

Hodes et al. in *J. Electrochem. Soc.*, 127, 544 (1980) reported the preparation of a CoS thin film on stainless steel. The two-steps method involves the electrodeposition, at 25° C. and for few minutes, of Co(OH)$_2$ onto the metallic substrate, from an aqueous solution of CoSO$_4$ with a potassium biphthalate buffer, at a current density that depends on the pH of the electrolyte. When immersed in a polysulfide solution, Co(OH)$_2$ is converted to cobalt sulfide, mainly CoS. However, when the above method is used to form a cobalt sulfide layer on a transparent conducting glass electrode (ITO), metallic cobalt is plated on the substrate (instead of Co(OH)$_2$) during the first step, that cannot be converted to COS by a subsequent immersion in the polysulfide solution.

Thus, it seems to be very difficult to fabricate, on ITO, COS thin films of easily controllable thicknesses (and therefore transparencies).

SUMMARY OF THE INVENTION

It is therefore an object of the present invention to overcome the above-mentioned drawbacks and to provide an electrode having thin layer of CoS thereon and a process of making the same.

According to a first aspect of the invention, there is provided an electrode comprising:
- a non-conductive substrate;
- a first layer disposed on the substrate, the layer comprising indium tin oxide or fluorine-doped SnO$_2$; and
- a second layer disposed on the first layer, the second layer comprising COS.

According to a second aspect of the invention, there is provided an indium tin oxide glass electrode or an indium tin oxide polymer electrode having thereon a layer comprising CoS.

According to a third aspect of the invention, there is provided an electrode comprising:
- a non-conductive substrate;
- a first layer disposed on the substrate, the first layer comprising indium tin oxide or fluorine-doped SnO$_2$;
- a second layer disposed on the first layer, the second layer comprising Co(OH)$_2$; and
- a third layer disposed on the second layer, the third layer comprising CoS.

According to a fourth aspect of the invention, there is provided an indium tin oxide glass electrode or an indium tin oxide polymer electrode having thereon a layer comprising Co(OH)$_2$ and another layer disposed on the layer of Co(OH)$_2$, the other layer comprising CoS.

According to a fifth aspect of the invention, there is provided a process for preparing an electrode, comprising the steps of:
a) providing a non-conductive substrate, the substrate having an indium tin oxide and/or a fluorine-doped SnO$_2$ layer thereon;
b) electrodepositing a layer comprising Co(OH)$_2$ on the indium tin oxide or fluorine-doped SnO$_2$ layer; and
c) converting at least a portion of the layer comprising Co(OH)$_2$ into a layer of CoS.

According to a sixth aspect of the invention, there is provided a process for preparing an electrode, comprising the steps of:
a) providing an indium tin oxide glass electrode;
b) electrodepositing a Co(OH)$_2$ layer on the indium tin oxide glass electrode; and
c) converting at least a portion of the Co(OH)$_2$ layer into a layer of CoS.

According to a seventh aspect of the invention, there is provided a process for preparing an electrode, comprising the steps of:
a) providing an indium tin oxide polymer electrode;
b) electrodepositing a Co(OH)$_2$ layer on the indium tin oxide polymer electrode; and
c) converting at least a portion of the Co(OH)$_2$ layer into a layer of CoS.

Applicant has found that by preparing an electrode according to the fifth, sixth, and seventh aspects of the invention, it was possible to obtain an ITO electrode or a fluorine-doped $SnO_2$ electrodes having thereon a thin and substantially transparent CoS layer. Moreover, the thickness of the CoS layer was substantially controllable. In fact, it has been observed that by using these processes, it was possible to obtain uniform and homogeneous CoS layers. Such a characteristic can also explain the transparency of the obtained electrodes. Thus, the obtained electrodes can be very interesting for uses in photovoltaic cells in view of their properties.

The expression "source of sulfur" as used herein refers to a compound or a blend of compounds capable of converting $Co(OH)_2$ into CoS.

The expression "substantially transparent" as used herein, when referring to a layer or a substrate, refers to a layer or a substrate having a transmittance of visible polychromatic light of at least 60%, preferably of at least 70%, more preferably of at least 80%, and even more preferably of at least 90%. A transmittance of at least 95% is preferred.

DESCRIPTION OF PREFERRED EMBODIMENTS

In the electrode according to the first and third aspects of the invention, the non-conductive substrate can be a polymer substrate or a glass substrate.

In the electrodes of the invention having a polymer substrate, the latter can comprise a polymer selected from the group consisting of polycarbonate, acetate, polyethylene terephthalate, polyethylene naphthalate and polyimide. Preferably, the polymer is selected from the group consisting of polyethylene terephthalate and polyimide.

In the electrode according to the second aspect of the invention, the glass electrode and/or the COS layer can be substantially transparent. The electrode can further includes a layer of $Co(OH)_2$ disposed between the indium tin oxide glass electrode and the COS layer.

In the electrodes of the invention the layer comprising CoS can have a thickness of less than about 30 μm. Preferably, the thickness is less than about 15 or preferably less than about 5 μm. A range of about 0.25 to about 4 μm is particularly preferred and a range of about 0.50 to about 2 μm is more preferred. The layer comprising CoS preferably consists of CoS.

In the electrodes of the invention having a layer comprising $Co(OH)_2$, this layer can have thickness of less than about 30 μm. Preferably, the thickness is less than about 15 or preferably less than about 5 μm. A range of about 0.25 to about 4 μm is particularly preferred and a range of about 0.50 to about 2 μm is more preferred. The layer comprising $Co(OH)_2$ preferably consists of $Co(OH)_2$.

In the electrodes of the invention, the non-conductive substrate is preferably substantially transparent. Moreover, the CoS layer and/or the $Co(OH)_2$ layer are/is also preferably substantially transparent. The electrode is also preferably transparent.

The electrodes of the present invention can have a transmittance of visible polychromatic light of at least 35%, preferably of at least 45%, more preferably of at least 60%, and even more preferably of at least 65%.

According to a preferred embodiment, the electrode comprises a $Co(OH)_2$ layer directly disposed on an ITO glass electrode or an ITO polymer electrode, and a CoS layer directly disposed on the $Co(OH)_2$ layer.

In the process according to the fifth aspect of the invention, step (b) is preferably carried out by:

i) using the substrate of step (a) as a cathode and providing a cobalt electrode as an anode;
ii) inserting the cathode and the anode into a cell having therein a solution comprising a cobalt salt and a buffer; and
iii) applying a galvanostatic current to the solution thereby forming a layer of $Co(OH)_2$ on the substrate or cathode.

The non-conductive substrate can be a glass substrate or a polymer substrate. The substrate of step (a) preferably has a sheet resistance of about 8 to about 15 $\Omega/\square$. When the non-conductive substrate is a polymer substrate, the current in step (iii) preferably has a density ranging from about 10 to about 15 $mA/cm^2$. The polymer substrate preferably comprises a polymer selected from the group consisting of polycarbonate, acetate, polyethylene terephthalate, polyethylene naphthalate and polyimide. Preferably, the polymer is selected from the group consisting of polyethylene terephthalate and polyimide. The substrate of step (a) can have a sheet resistance of about 8 to about 15 $\Omega/\square$. The substrate in step (a) preferably has an indium tin oxide layer thereon.

In the process according to the sixth aspect of the invention, step (b) is preferably carried out by:

i) using the electrode of step (a) as a cathode and providing a cobalt electrode as an anode;
ii) inserting the cathode and the anode into a cell having therein a solution comprising a cobalt salt and a buffer; and
iii) applying a galvanostatic current to the solution thereby forming a layer of $Co(OH)_2$ on the substrate or cathode.

The indium tin oxide glass electrode preferably has a sheet resistance ranging from about 8 to about 15 $\Omega/\square$.

In the process according to the fifth and sixth aspects of the invention, a reference electrode can further be used. Preferably, the reference electrode is a Ag/AgCl electrode or a saturated calomel electrode. The solution in step (ii) preferably has a pH of about 6.0 to about 7.5 and preferably from about 6.8 to about 7.5. The solution in step (ii) can further comprises LiCl, NaCl, KCl, or CsCl. The buffer is preferably a $NH_4Cl/NH_4OH$ buffer. The cobalt salt is preferably selected from the group consisting of cobalt acetate, cobalt chloride, cobalt nitrate, cobalt sulphate and mixtures thereof. Cobalt sulphate is preferred. The current in step (iii) preferably has a density ranging from about 15 to about 30 $mA/cm^2$. The current is preferably applied for a period of time ranging from about 1 to about 120 seconds and more preferably from about 1 to about 30 seconds.

In step (iii) according to the process defined in the fifth aspect of the invention, the layer of $Co(OH)_2$ electrodeposited on the substrate is preferably substantially transparent.

In step (iii) according to the process defined in the sixth aspect of the invention, the layer of $Co(OH)_2$ electrodeposited on the electrode is preferably substantially transparent.

Step (c) in the process according to the fifth and sixth aspects of the invention, is preferably carried out by contacting the layer of $Co(OH)_2$ with a basic solution comprising at least one source of sulfur. The basic solution preferably has a pH of at least 10. The pH is preferably of about 13.0 to about 14.0. The basic solution preferably comprises S together with $Li_2S$, $Na_2S$, $K_2S$ or mixtures thereof. More preferably, the basic solution comprises S together with $Na_2S$. The basic solution can include a base selected from the group consisting of LiOH, NaOH, $NH_4OH$, KOH and mixtures thereof. KOH is particularly preferred and more particularly when using a glass substrate. Step (c) is preferably carried out by dipping the electrode so formed in step (b) into the basic solution for a period of time ranging from 5 to 60 minutes. A period of time ranging from 15 to 30 minutes is preferred. When a polymer substrate is used, NH$_4$OH or a similar weak base is particularly preferred.

It will be understood by the person skilled in the art that all the preferred embodiments previously described for the processes of the fifth and sixth aspects of the invention are also valuable, when applicable, to the process of the seventh aspect of the invention.

The electrodes according to any aspects of the invention can be used as an anode or as a cathode. The electrodes of the invention can be used for reducing a disulfide into a corresponding thiolate. Alternatively, they can be used for oxidizing a thiolate into a corresponding disulfide.

The disulfide can be a disulfide of formula (I):

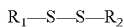

in which $R_1$ and $R_2$ are same or different and selected from the group consisting of $C_2$-$C_{20}$ alkenyl, $C_1$-$C_{20}$ alkyl, $C_2$-$C_{20}$ alkynyl, $C_6$-$C_{20}$ aralkyl, $C_6$-$C_{12}$ aryl, $C_3$-$C_8$ cycloalkyl and $C_2$-$C_{12}$ heteroaryl comprising 1 to 4 heteroatoms. Preferably, $R_1$ and $R_2$ are identical. The heteroatoms can be selected from the group consisting of N, O and S.

Preferably, the disulfide is a disulfide of formula (I):

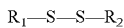

in which $R_1$ and $R_2$ are same or different and selected from the group consisting of

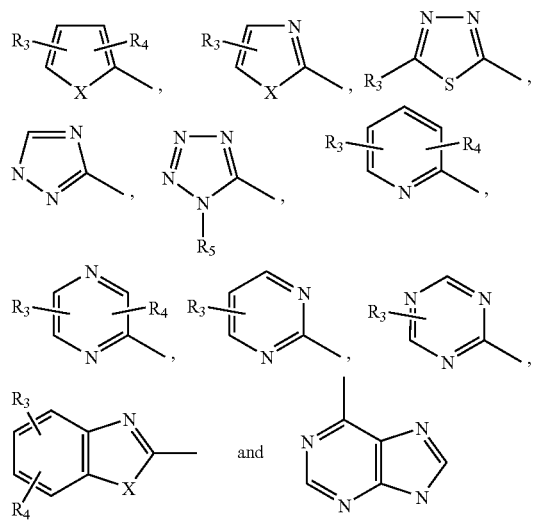

wherein
$R_3$ and $R_4$ are same or different and selected from the group consisting of a hydrogen atom, halogen atom, —NO$_2$, —OH, —CF$_3$—COR$_6$, —COOH, —COOR$_6$, —NHR$_5$ $C_2$-$C_8$ alkenyl, $C_1$-$C_6$ alkoxy, $C_1$-$C_8$ alkyl, $C_2$-$C_8$ alkynyl, $C_6$-$C_{20}$ aralkyl, $C_6$-$C_{12}$ aryl, $C_3$-$C_8$ cycloalkyl and $C_2$-$C_{12}$ heteroaryl comprising 1 to 4 heteroatoms selected from the group consisting of N, O and S,
$R_5$ is a $C_1$-$C_8$ alkyl, $C_6$-$C_{12}$ aryl, $C_3$-$C_8$ cycloalkyl, $C_2$-$C_{12}$ heteroaryl comprising 1 to 4 heteroatoms selected from the group consisting of N, O and S, or any suitable protecting group for a nitrogen atom, such protecting groups are known by the person skilled in the art and are defined in T. W. Green and P. G. M. Wuts, *Protective Groups* in Organic Synthesis, 3rd edition, Wiley Interscience, New York, 1999, which is hereby incoparated by reference, $R_6$ is a $C_1$-$C_8$ alkyl, or a $C_3$-$C_8$ cycloalkyl, and
X is N, O or S.

More preferably, the disulfide is of formula (I):

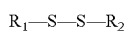

in which $R_1$ and $R_2$ are same and selected from the group consisting of

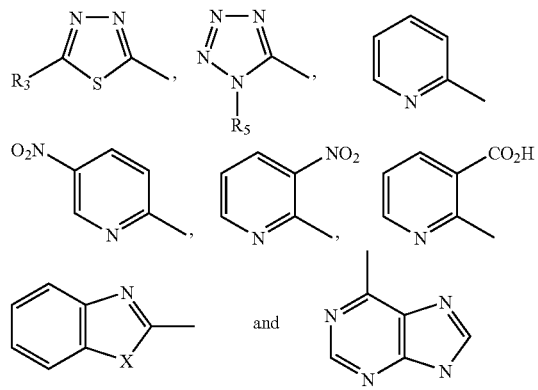

wherein
$R_3$ is a $C_1$-$C_8$ alkyl or CF$_3$,
$R_5$ is a $C_1$-$C_8$ alkyl or a phenyl, and
X is N, O or S.

A particularly preferred disulfide is a disulfide wherein $R_1$ and $R_2$ are

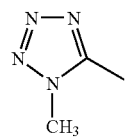

According to another aspect of the invention, there is provided a photovoltaic cell comprising an electrode as defined in the present invention.

According to still another aspect of the invention, there is provided a photovoltaic cell comprising an anode, an electrolyte and, as a cathode, an electrode as defined in the present invention. The anode can comprise a n-type semiconductor. The n-type semiconductor is preferably n-CdSe. The electrolyte can comprise a redox couple together with a solvent, a polymer, a gel or a combination thereof. The redox couple is preferably $R_1$SM/$(R_1S)_2$ in which:

M is a metal selected from the group consisting of Li, Na, K and Cs;
$R_1S^-$ is a thiolate and $(R_1S)_2$ is a corresponding disulfide wherein $R_1$ is selected from the group consisting of

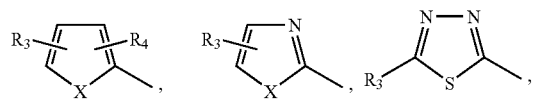

-continued

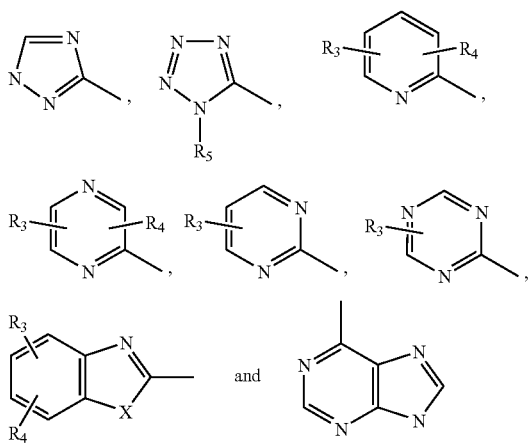

wherein $R_3$ and $R_4$ are same or different and selected from the group consisting of a hydrogen atom, halogen atom, —$NO_2$, —OH, —$CF_3$ —$COR_6$, —COOH, —$COOR_6$, —$NHR_5$ $C_2$-$C_8$ alkenyl, $C_1$-$C_6$ alkoxy, $C_1$-$C_8$ alkyl, $C_2$-$C_8$ alkynyl, $C_6$-$C_{20}$ aralkyl, $C_6$-$C_{12}$ aryl, $C_3$-$C_8$ cycloalkyl and $C_2$-$C_{12}$ heteroaryl comprising 1 to 4 heteroatoms selected from the group consisting of N, O and S, $R_5$ is a $C_1$-$C_8$ alkyl, $C_6$-$C_{12}$ aryl, $C_3$-$C_8$ cycloalkyl, $C_2$-$C_{12}$ heteroaryl comprising 1 to 4 heteroatoms selected from the group consisting of N, O and S, or any suitable protecting group for a nitrogen atom, $R_6$ is a $C_1$-$C_8$ alkyl, or a $C_3$-$C_8$ cycloalkyl, and X is N, O or S.

More preferably, the redox couple is $R_1SM/(R_1S)_2$ in which:

M is a metal selected from the group consisting of Li, Na, K and Cs;

$R_1S^-$ is a corresponding disulfide wherein $R_1$ is selected from the group consisting of

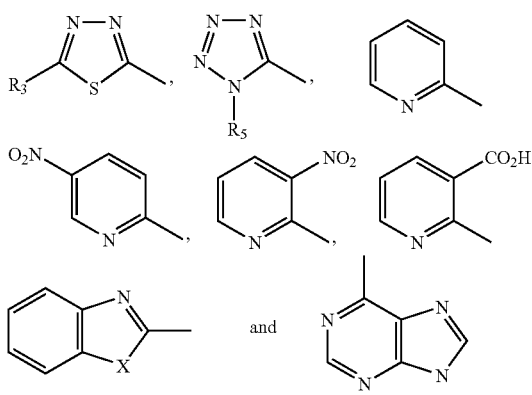

wherein $R_3$ is a $C_1$-$C_8$ alkyl or $CF_3$ $R_5$ is a $C_1$-$C_8$ alkyl or a phenyl, and X is N, O or S.

Even more preferably, $R_1$ is

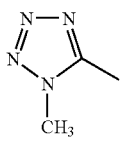

According to another aspect of the invention, there is provided a method for reducing disulfides into thiolates comprising the step of electrochemically reducing the disulfides by means of any one of the electrodes of the present invention.

According to another aspect of the invention, there is provided a method for oxidizing thiolates into disulfides, comprising the step of electrochemically oxidizing the thiolates by means of any one of the electrodes of the present invention.

The electrodes of the invention can also be used for reducing a triiodide ($I_3^-$) or iodine ($I_2$) into an iodide ($I^-$). Alternatively, they can be used for oxidizing an iodide ($I^-$) into a triiodide ($I_3^-$) or iodine ($I_2$).

The iodide ($I^-$) can be provided from a compound of formula (IIA):

$$M^+I^-$$

in which $M^+$ is a metal selected from the group consisting of $Li^+$, $Na^+$, $K^+$, $Rb^+$ and $Cs^+$.

The electrodes of the present invention can be used for catalyzing oxidation/reduction reactions for a redox couple. The redox couple can be $M^+/I_3^-$ or $M^+I^-/I_2$ in which $M^+$ is a metal selected from the group consisting of $Li^+$, $Na^+$, $K^+$, $Rb^+$ and $Cs^+$. The redox couple can be dissolved in liquid organic solvents like ethylene carbonate (>37° C.), propylene carbonate, ethylmethyl carbonate, dimethyl carbonate, diethyl carbonate, methoxyacetonitrile, acetonitrile, N,N-dimethylformamide, dimethyl sulfoxide, methoxypropionitrile, 3-methyl-2-oxazolidinone and mixtures thereof. The electrolytic solution (hereafter called the electrolyte) can also be incorporated in silica nanoparticles or a polymer to form a gel. Examples of such compounds include poly(ethylene glycol), poly(ethylene oxide), poly(acrylonitrile), poly(epichlorohydrin-co-ethylene oxide), poly(methyl methacrylate) and poly(vinylidenefluoride-co-hexafluoropropylene). Another possibility is to incorporate the redox couple in a solvating polymer to form a solid polymer electrolyte. Examples of such compounds include poly(ethylene oxide) and polyphosphazene. The concentration of compound of formula (IIA) is between about 0.05 M and 0.9 M, and iodine is at a concentration of at least 0.005 M. More preferably, the electrolyte is $KI/I_2$ (50 mM/5 mM) and is dissolved in N,N-dimethylformamide and dimethyl sulfoxide (60/40).

Also, the iodide ($I^-$) can be provided from a compound of formula (IIB):

$$T^+I^-$$

in which $T^+$ is an organic cation and preferably an heterocyclic cation.

Alternatively, the redox couple can thus be $T^+I^-/I_3^-$ or $T^+I^-/I_2$. The compound of formula (IIB) can be provided in the form of an ambient temperature ionic liquid (also known as ambient temperature molten salt or room-temperature ionic liquid (RTIL)), which can consist of an heterocyclic cation based on substituted imidazole and an iodide anion.

The compound of formula (IIB) can be a compound of formula

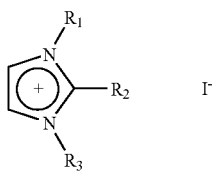

(III)

in which $R_1$ and $R_3$ are same or different and selected from the group consisting of $C_1$-$C_9$ alkyl and benzyl, and $R_2$ is a $C_1$-$C_9$ alkyl or H.

In a particular embodiment, some of these compounds of formula (III) are not liquid at ambient temperature so they have to be dissolved in organic solvents or ionic liquids comprising an anion that is not iodide. Examples of such anions are halogen atoms, polyiodides ($I_2^-$, $I_3^-$, $I_5^-$, $I_7^-$, $I_9^-$ and $I_{11}^-$), $PF_6^-$, $BF_4^-$, bis(trifluoromethanesulfonyl)amide, trifluoromethanesulfonate, dicyanamide, $AlCl_4^-$, $ClO_4^-$, $NO_3^-$, $CH_3COO^-$, $CF_3COO^-$, $C_4F_9SO_3^-$, 2.3 HF, 2,2,2-trifluoro-N-(trifluoromethylsulfonyl)acetamide, $CH_3SO_3^-$, $CH_3C_6H_4SO_3^-$, $AsF_6^-$, $CF_3SO_3^-$ and $(CF_3SO_2)_3C^-$. Ionic liquids of this type have many benefits: they can dissolve an enormous range of inorganic, organic and polymeric materials at very high concentrations, are non-corrosive, have low viscosities and no significant vapor pressures.

The compound of formula (IIB) can also be a compound of formula (IV):

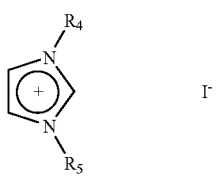

(IV)

in which $R_4$ and $R_5$ are same or different and represent a $C_1$-$C_6$ alkyl.

Preferably, the compound of formula (IV) is 1,3-ethylmethylimidazolium iodide (EMI-I):

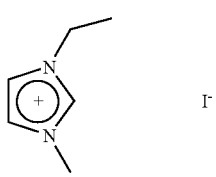

The electrolyte can thus be EMI-I/$I_2$ (163 mM/10 mM) dissolved in EMI-TFSI (trifluoromethyl sulfonylimide).

When using a compound of formula (III) or (IV) in a solar cell, its concentration is comprised between 0.05 and 0.9 M, when the compound is in a solid form. For iodine, the concentration is between 5 and 100 mM. When the compound is liquid at room temperature, it is used thereof and dissolves a concentration of iodine comprised between 5 and 500 mM.

The compound of formula (IIB) can also be a compound of formula (V):

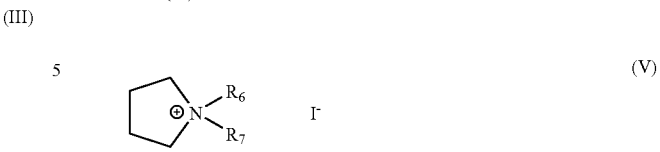

(V)

in which $R_6$ and $R_7$ are same or different and selected from the group consisting of a hydrogen atom and a $C_1$-$C_7$ alkyl.

The compound of formula (IIB) can also be a compound (pyrrolinium cation) of formula (VI) which lies between the fully saturated pyrrolidinium cation and the semi-aromatic imidazolium cation:

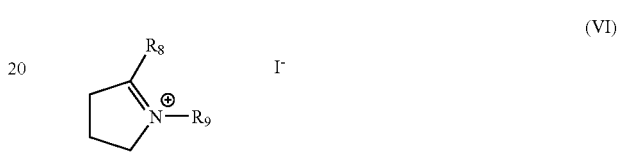

(VI)

in which $R_8$ and $R_9$ are same or different and selected from the group consisting of hydrogen atom and $C_1$-$C_4$ alkyl.

The compound of formula (IIB) can also be a compound of formula (VII):

(VII)

in which $R_{10}$, $R_{11}$ and $R_{12}$ are same or different and represent a $C_1$-$C_{12}$ alkyl. Preferred compounds of formula (VII) are: ($Et_2MeS$)I, ($Bu_2MeS$)I and ($Bu_2EtS$)I, which are in liquid form at room temperature.

The compound of formula (IIB) can also be a compound of formula (VIII):

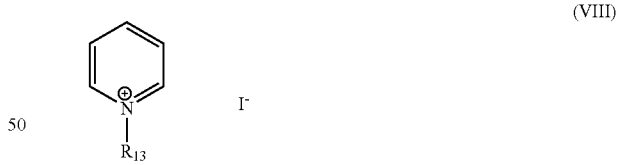

(VIII)

in which $R_{13}$ is selected from the group consisting of a hydrogen atom, a halogen atom and a $C_1$-$C_{18}$ alkyl.

The compound of formula (IIB) can also be a compound of formula (IX):

(IX)

in which $R_{14}$ and $R_{15}$ are same or different and represent a $C_1$-$C_3$ alkyl.

The compound of formula (IIB) can also be a compound of formula (X):

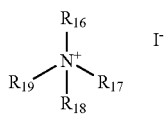

(X)

in which $R_{16}$ to $R_{19}$ are same or different and selected from the group consisting of hydrogen atom, $C_1$-$C_{12}$ alkyl (preferably isopropyl), $C_2$-$C_6$ alkoxyalkyl (preferably methoxymethyl and ethoxymethyl), $C_3$ alkenyl and $C_3$ alkynyl.

In the photovoltaic cell of the invention comprising redox couple, the latter can also be a redox couple comprising an iodide of formula (IIA) or (IIB) as previously defined, with $I_3^-$ or $I_2$.

According to another aspect of the invention, there is provided a method for reducing a triiodide ($I_3^-$) or iodine ($I_2$) into an iodide ($I^-$) comprising the step of electrochemically reducing the triiodide or iodine by means of any one of the electrodes of the present invention.

According to another aspect of the invention, there is provided a method for oxidizing an iodide ($I^-$) into a triiodide ($I_3^-$) or iodine ($I_2$), comprising the step of electrochemically oxidizing the iodide by means of any one of the electrodes of the present invention.

According to another aspect of the invention, there is provided a method for catalyzing oxidation and reduction reactions of a redox couple of formula $R_1SM/(R_1S)_2$, as previously defined, comprising the step of submitting the redox couple to an electrical current between at least two electrodes wherein at least one of the electrodes is an electrode as defined in the present invention.

According to another aspect of the invention, there is provided a method for catalyzing oxidation and reduction reactions of a redox couple of formula $M^+I^-/I_3^-$ or $M^+I^-/I_2$, as previously defined, comprising the step of submitting the redox couple to an electrical current between at least two electrodes wherein at least one of the electrodes is an electrode as defined in the present invention.

According to another aspect of the invention, there is provided a method for catalyzing oxidation and reduction reactions of a redox couple of formula $T^+I^-/I_3^-$ or $T^+I^-/I_2$, as previously defined, comprising the step of submitting the redox couple to an electrical current between at least two electrodes wherein at least one of the electrodes is an electrode as defined in the present invention, and wherein $T^+$ is as previously defined.

Further features and advantages of the invention will become more readily apparent from the following description of preferred embodiments as illustrated by way of examples in the appended drawings wherein.

Figure 5:
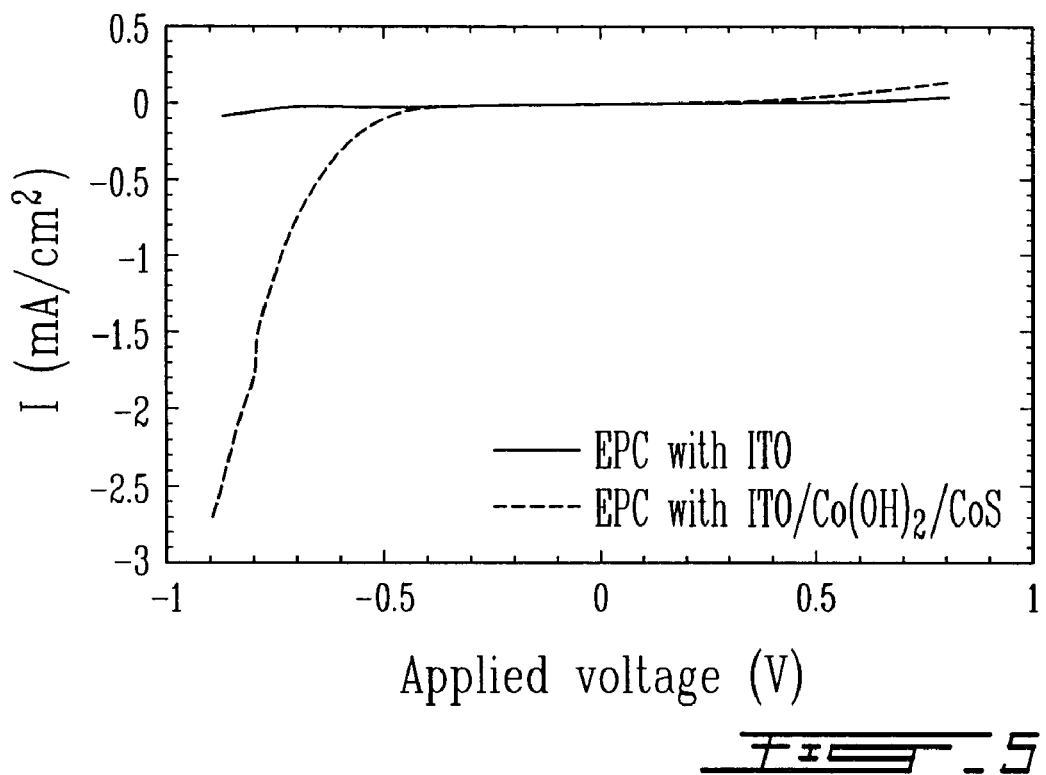
FIG. 5 is a plot showing the influence of Co(OH)$_2$ and CoS layers on an ITO on glass electrode in an Electrochemical Photovoltaic Cell (EPC) in darkness.
Figure 6:
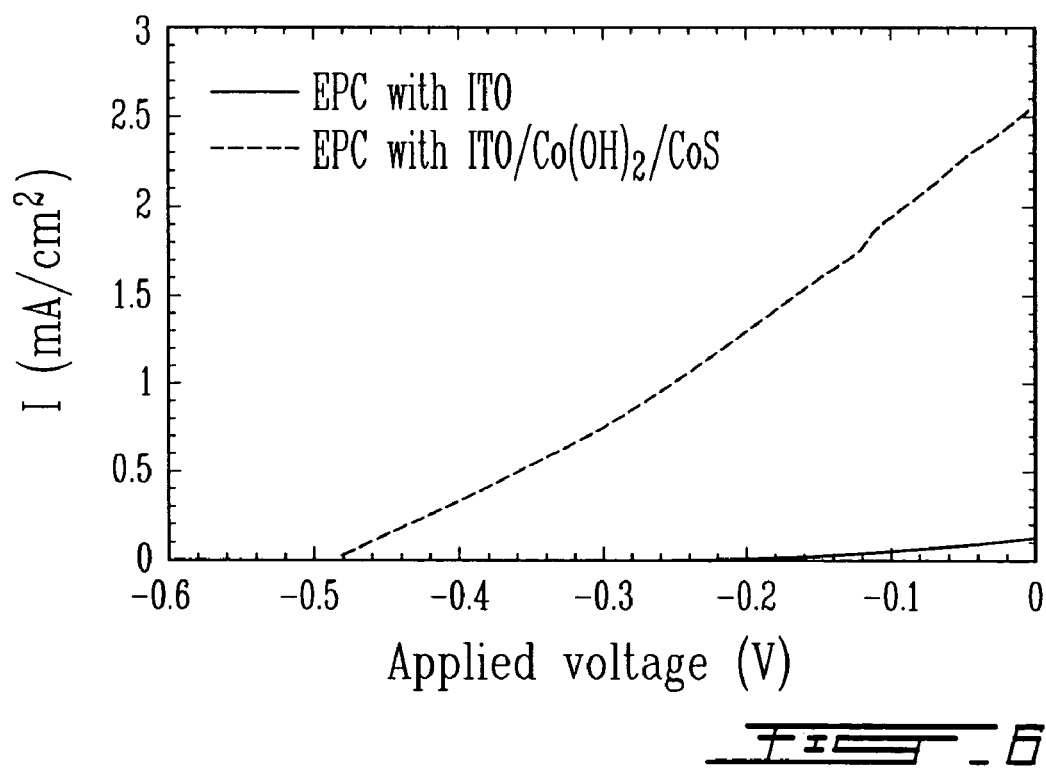
Figure 7:
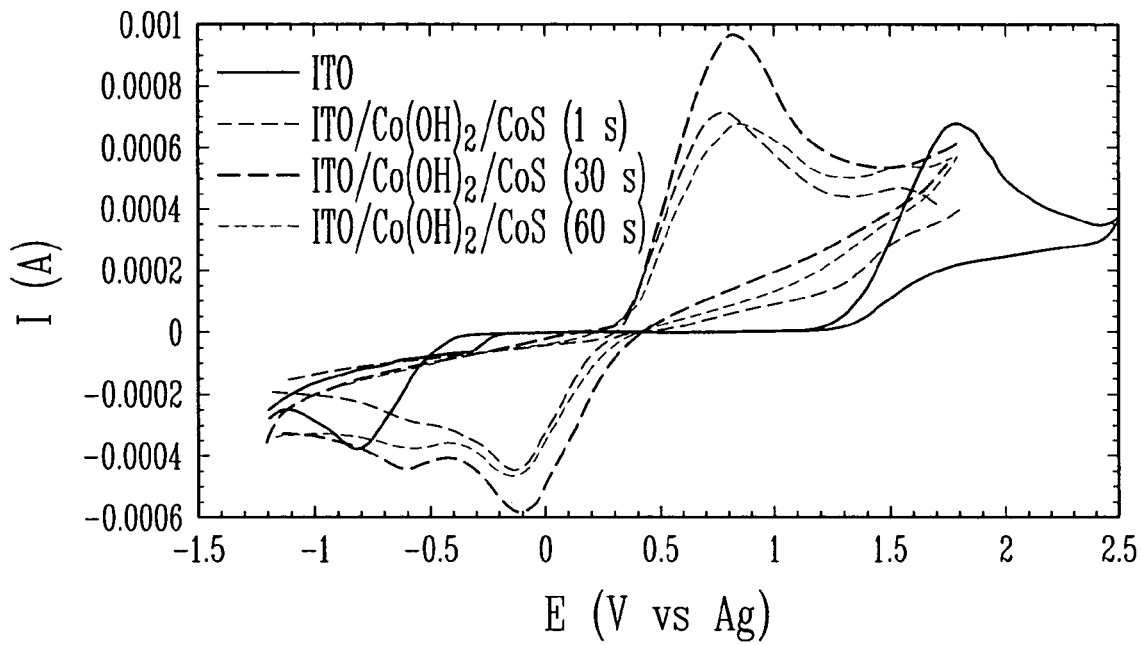
Figure 8:
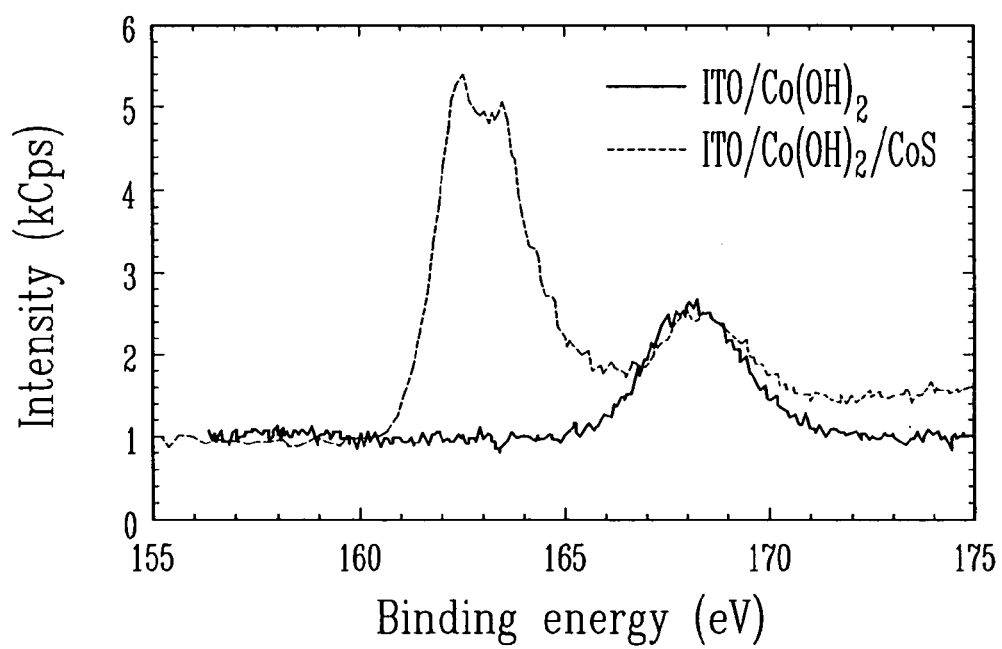
Figure 9:
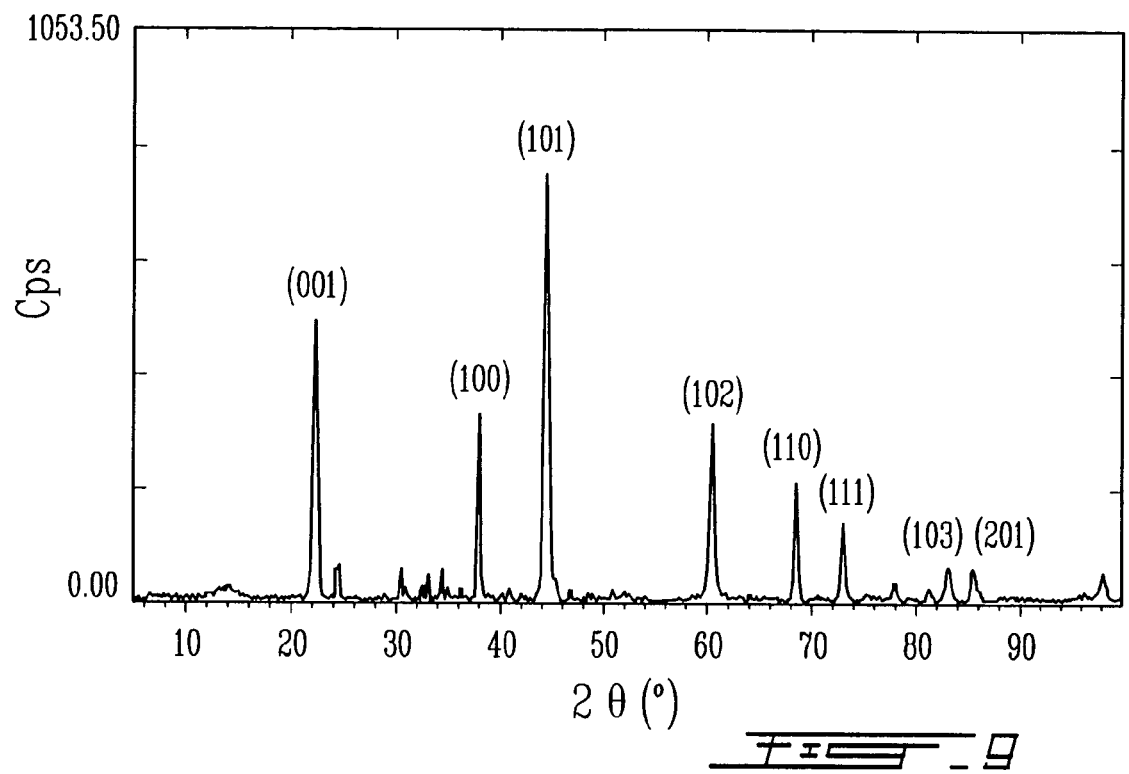
Figure 10:
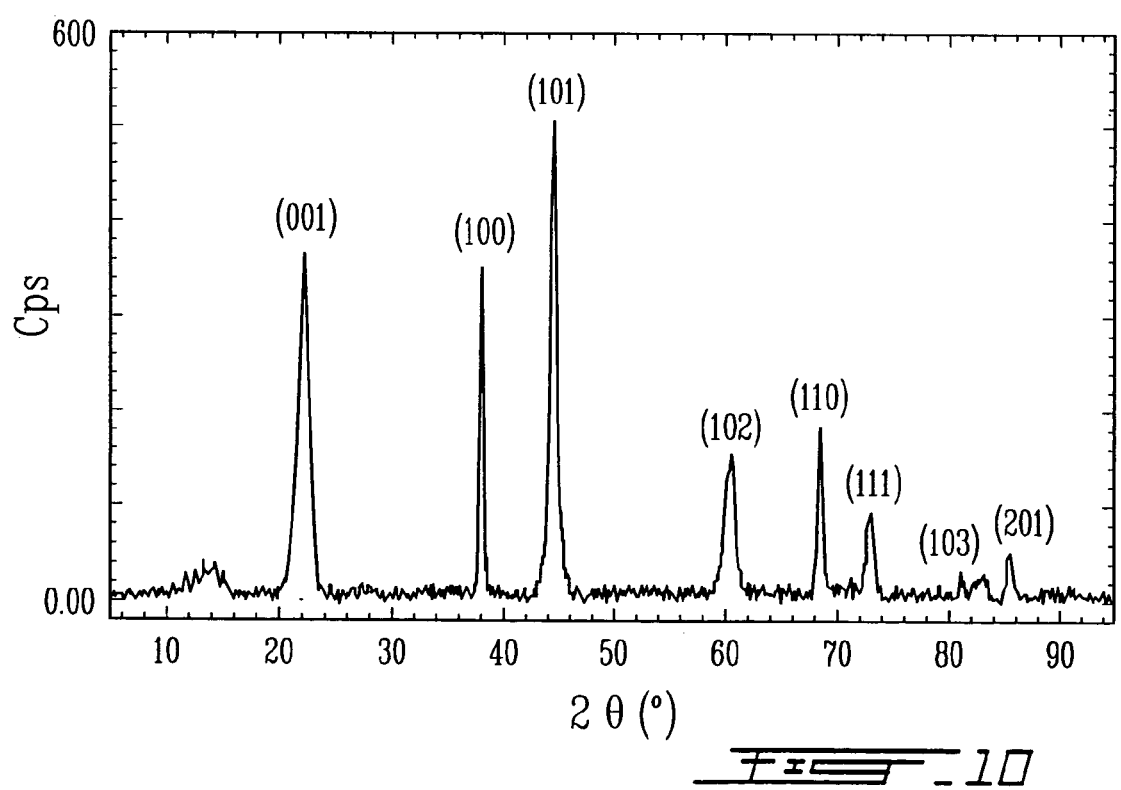
Figure 11:
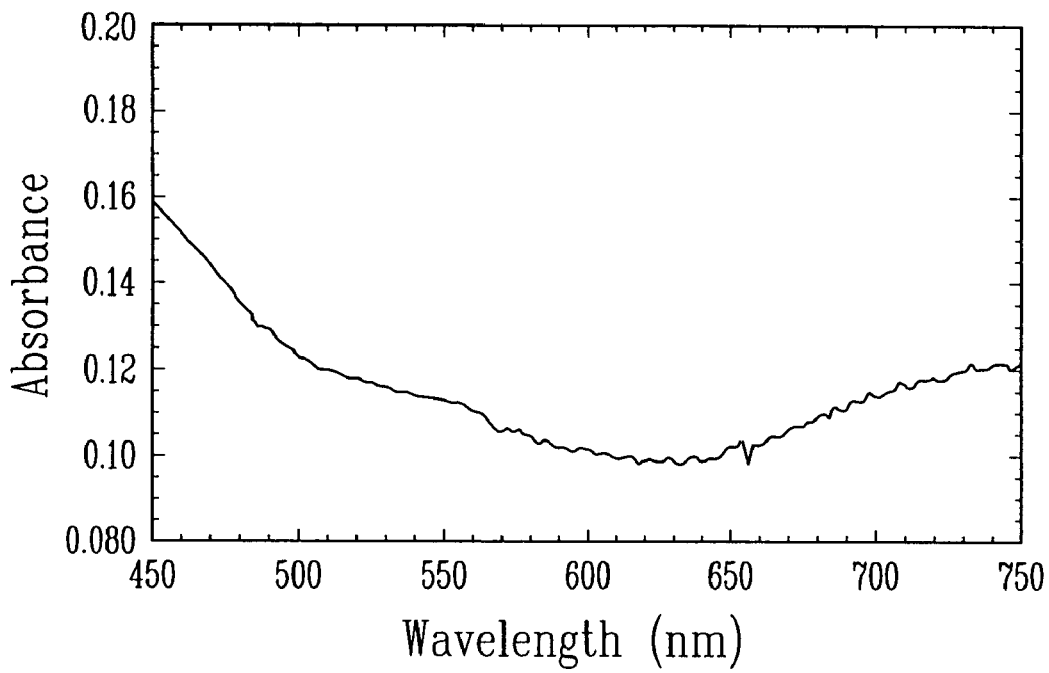
Figure 12:
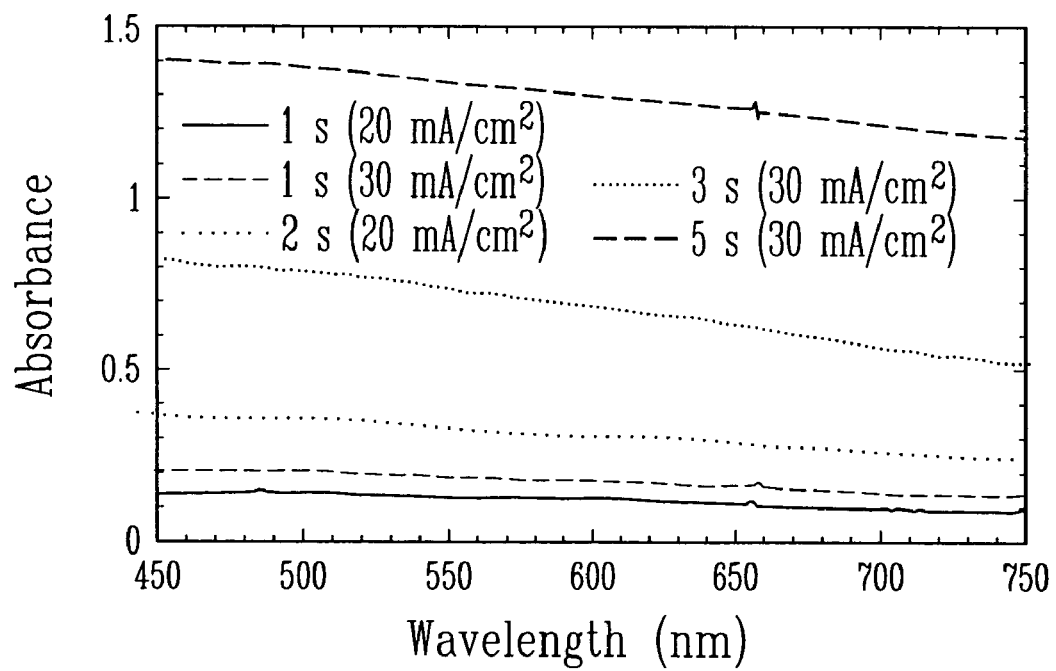
Figure 13:
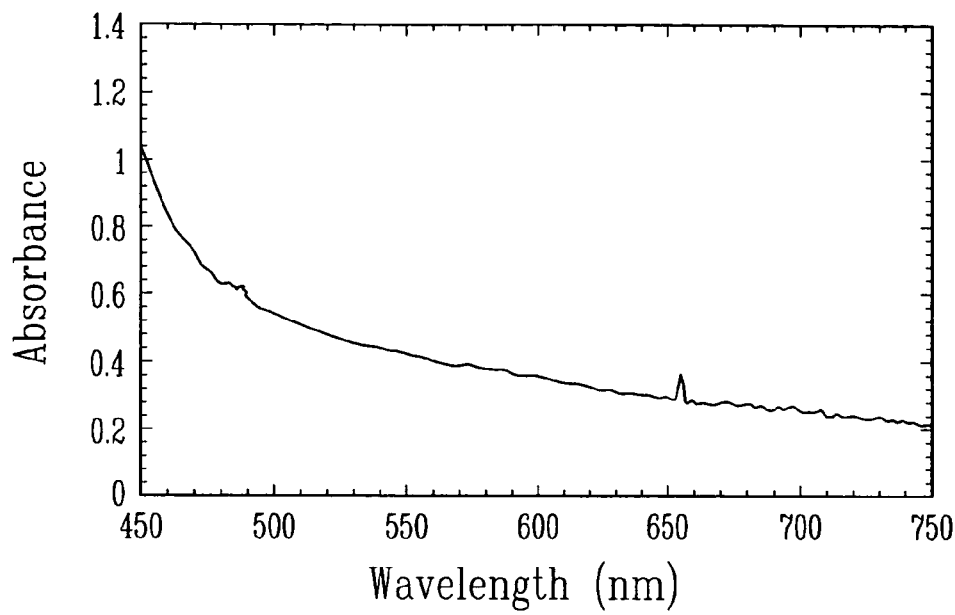
Figure 14:
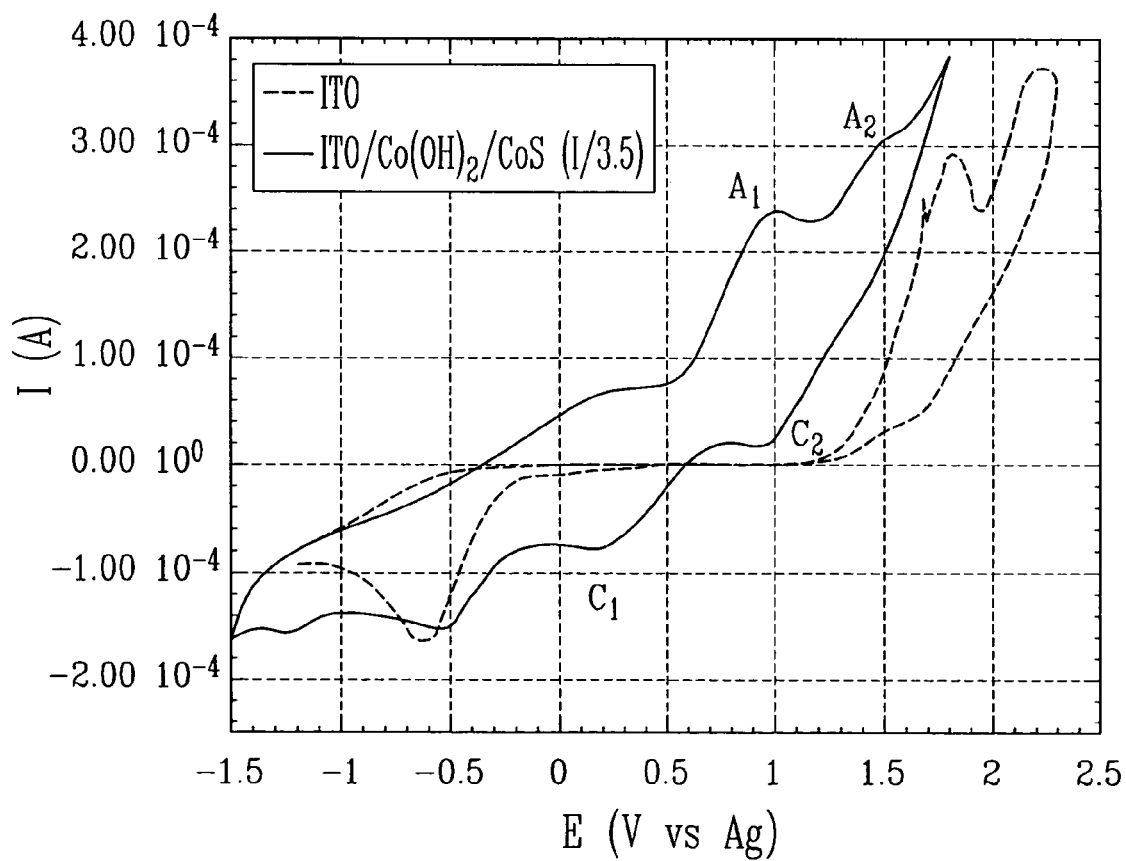
Figures 15, 16:
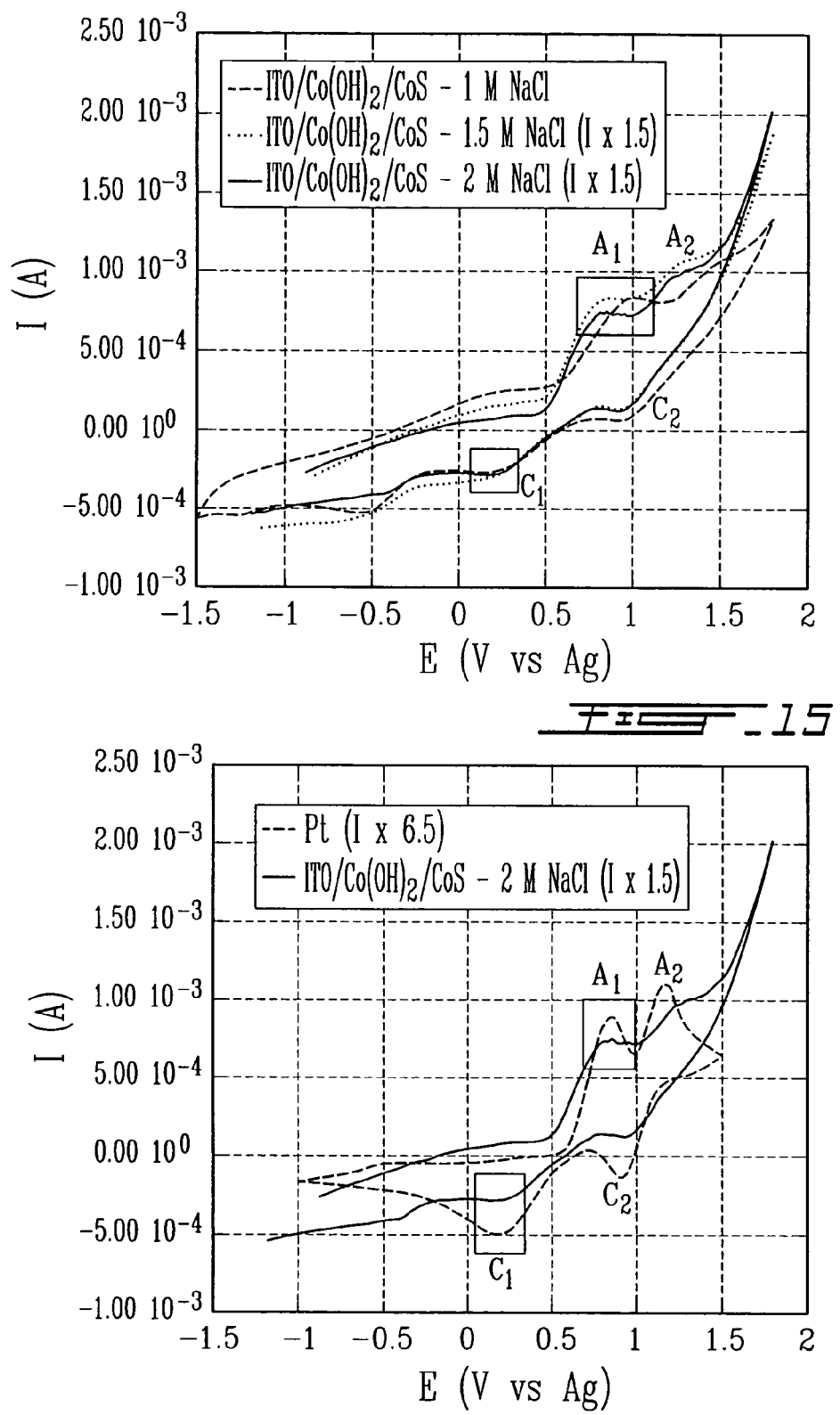
Figure 17:
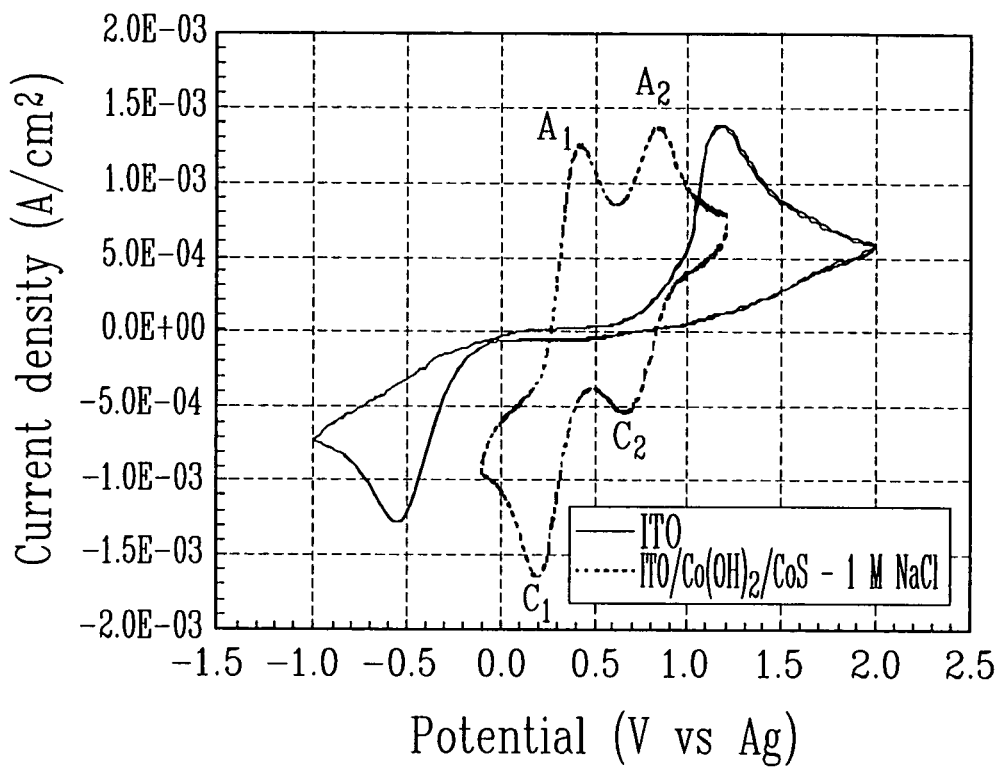
Figure 18:
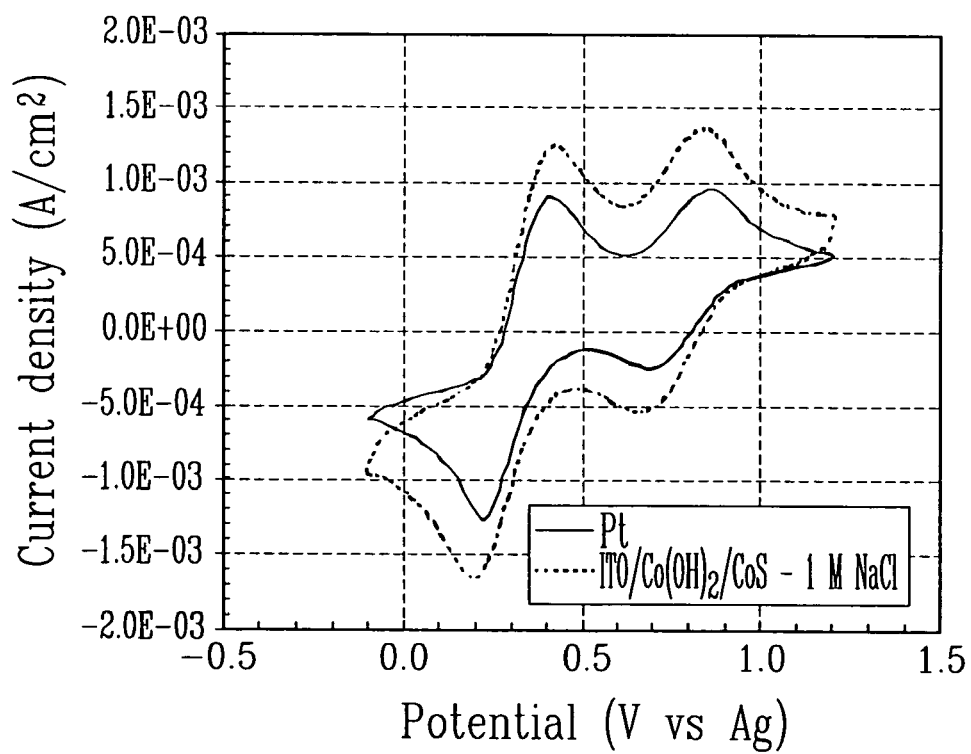
Figure 19:
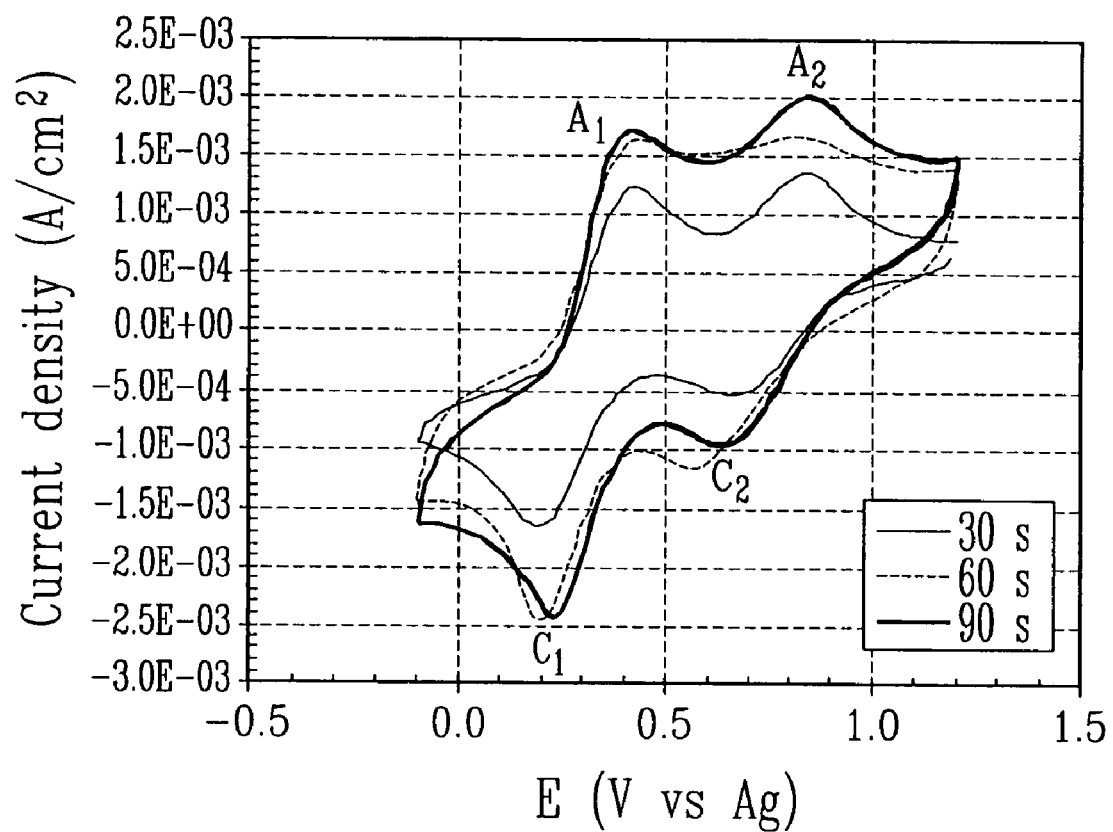
Figure 20:
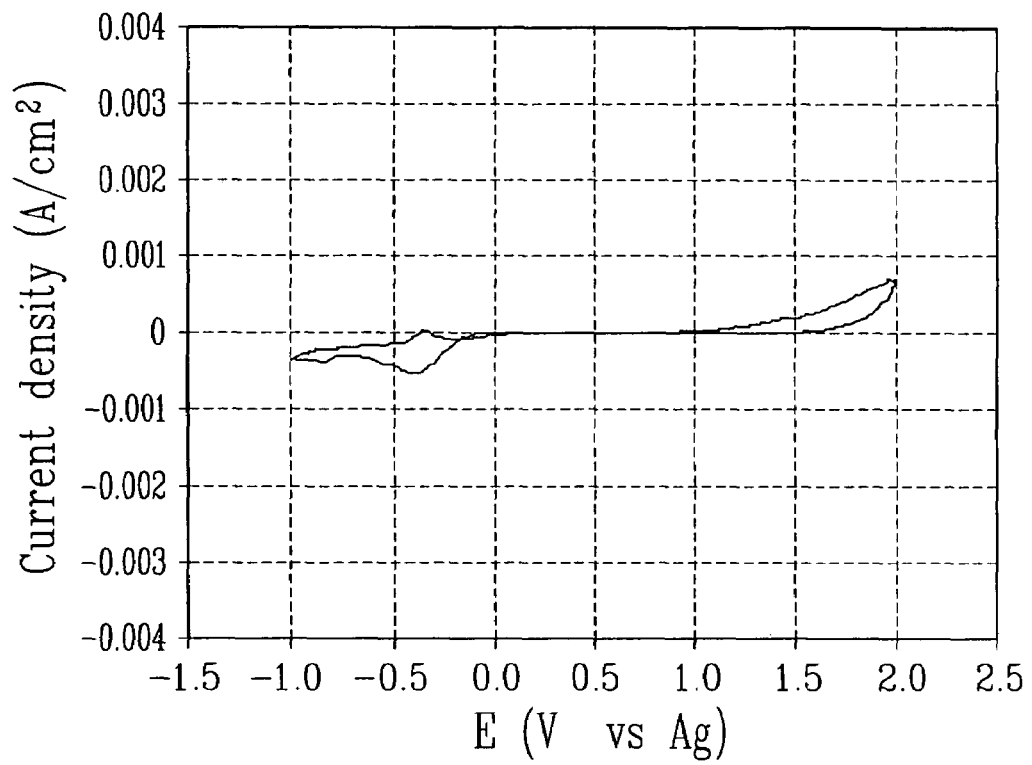
Figure 21:
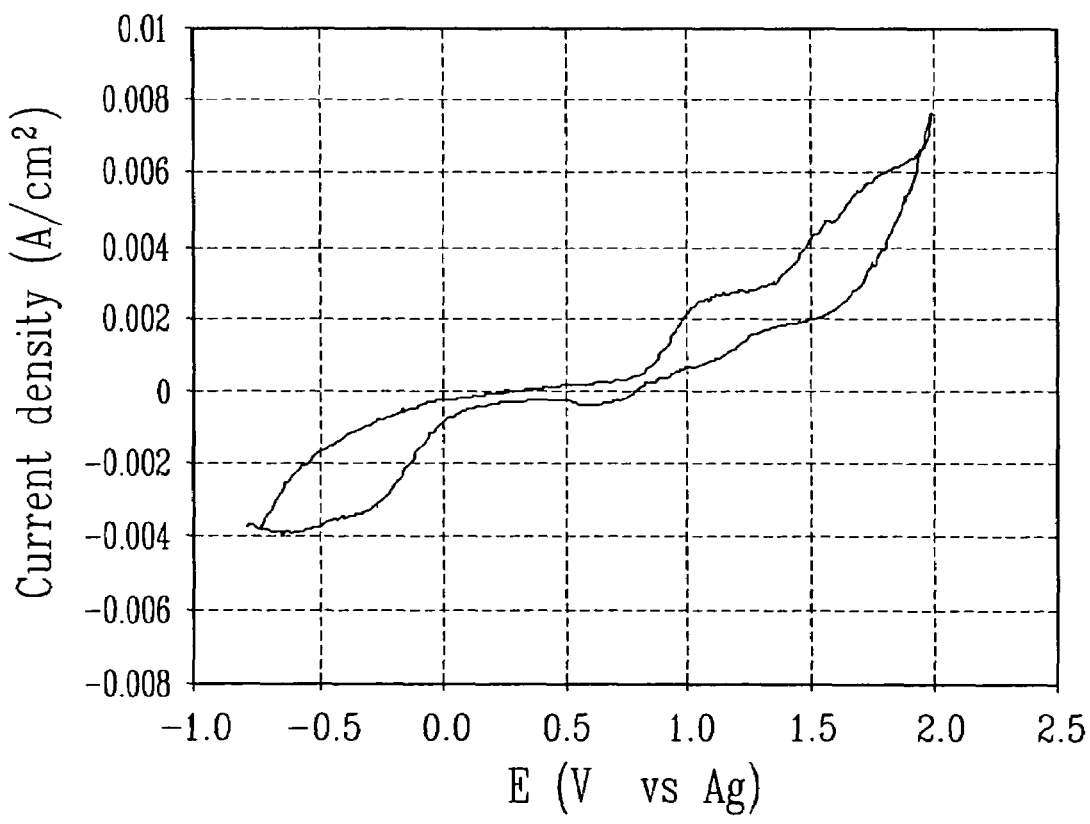

FIG. 6 is a plot showing the influence of Co(OH)$_2$ and CoS layer on an ITO on glass electrode in the Electrochemical Photovoltaic Cell of FIG. 5, under a polychromatic light; and FIG. 7 shows still further cyclic voltammograms demonstrating the influence of the deposition time of the Co(OH)$_2$ layer in an ITO on glass/Co(OH)$_2$/CoS electrode according to a preferred embodiment of the invention;

FIG. 8 shows X-Ray Photoelectron Spectroscopy (XPS) spectra (analysis of sulphur) carried out on an ITO on glass/Co(OH)$_2$ electrode and an ITO on glass/Co(OH)$_2$/CoS electrode according to a preferred embodiment of the invention;

FIG. 9 shows an X-ray Diffraction (XRD) pattern of an ITO on glass/Co(OH)$_2$ electrode prepared by a method which constitutes a preferred embodiment of the invention;

FIG. 10 shows an XRD pattern of a chemically prepared Co(OH)$_2$ powder;

FIG. 11 shows a visible absorption spectrum of an ITO on glass electrode;

FIG. 12 shows visible absorption spectra of ITO on glass/Co(OH)$_2$/CoS electrodes according to preferred embodiments of the invention;

FIG. 13 shows a visible absorption spectrum of a gel electrolyte;

FIG. 14 shows cyclic voltammograms comparing an ITO on glass electrode with an ITO on glass/Co(OH)$_2$/CoS electrode in a DMF/DMSO (60/40)/0.1 M TBAP solution comprising 50 mM of KI and 5 mM of I$_2$ according to a preferred embodiment of the invention;

FIG. 15 shows other cyclic voltammograms demonstrating the influence of the NaCl concentration in the electrodepositing solution utilized for the electrodeposition of the Co(OH)$_2$ layer on ITO on glass, to prepare ITO on glass/Co (OH)$_2$/COS electrodes, in a DMF/DMSO (60/40)/0.1 M TBAP solution comprising 50 mM of KI and 5 mM of I$_2$ according to a preferred embodiment of the invention;

FIG. 16 shows still other cyclic voltammograms comparing a Pt electrode with an ITO on glass/Co(OH)$_2$/COS electrode in a DMF/DMSO (60/40)/0.1 M TBAP solution comprising 50 mM of KI and 5 mM of I$_2$ according to a preferred embodiment of the invention;

FIG. 17 shows further cyclic voltammograms comparing an ITO on glass with an ITO on glass/Co(OH)$_2$/COS electrode in a EMI-TFSI solution comprising 0.163 M of EMI-I and 10 mM of I$_2$ according to a preferred embodiment of the invention;

FIG. 18 shows still further cyclic voltammograms comparing a Pt electrode with an ITO on glass/Co(OH)$_2$/CoS electrode in a EMI-TFSI solution comprising 0.163 M of EMI-I and 10 mM of I$_2$ according to a preferred embodiment of the invention;

FIG. 19 shows other cyclic voltammograms demonstrating the influence of the electrodeposition time of the Co(OH)$_2$ layer on ITO on glass, to prepare ITO on glass/Co(OH)$_2$/COS electrodes, in a EMI-TFSI solution comprising 0.163 M of EMI-I and 10 mM of I$_2$ according to a preferred embodiment of the invention;

FIG. 20 shows a cyclic voltammogram of an ITO on polymer (polyethylene terephthalate) electrode having a surface area of 0.05 cm$^2$; and FIG. 21 shows a cyclic voltammogram of an ITO on polymer (polyethylene terephthalate)/Co(OH)$_2$/CoS electrode having a surface area of 0.05 cm$^2$ according to a preferred embodiment of the invention.

The following non-limiting examples further illustrate the invention.

EXAMPLES

Indium tin oxide on glass electrodes and indium tin oxide on polymer electrodes having thereon a layer of Co(OH)$_2$ and a layer of CoS have been prepared according to the following method.

1) Electrodeposition

Prior to electrodeposit a layer of Co(OH)$_2$ on ITO on glass obtained from LIBBEY OWENS FORD (trade-mark), the latter is cleaned with soap and water, rinsed with water and dried by means of acetone. Then, the electrode is sonicated in dichloromethane for a period of 5 minutes prior to be air dried. Finally, the electrode is connected to a copper clip prior to the electrodeposition.

The electrodeposition is carried out in a cell having three electrodes (by means of a potentiostat) by applying a constant current (galvanostatic mode). The cell contains 25 mL of a solution comprising 20 g/L of CoSO$_4$ and 1 to 2 M of NaCl. The solution also comprises 100 µL of a NH$_4$Cl/NH$_4$OH buffer in order to maintain the pH in a range of about 6.8 to about 7.5. The buffer contains 1.6875 g of NH$_4$Cl and 3.575 g of NH$_4$OH.

The ITO on glass electrode, which has a surface area of about 0.1 to about 0.5 cm$^2$ exposed to the solution, is used as a cathode and a cobalt electrode is used as an anode. The cobalt anode has a surface area of about 8 cm$^2$ and is located at about 3 cm from the cathode. A Ag/AgCl reference electrode is also utilized.

The density of the cathodic current preferably ranges from 15 to 30 mA/cm$^2$. By using such densities of current, the layer of electrodeposited Co(OH)$_2$ is of good quality, and can be thin and transparent.

Such an electrodeposition can be performed by using, as a cathode, an electrode comprising a polymeric material (or polymer substrate) having a layer of ITO thereon. When such an electrode is used, it is first cleaned with soap and water in an ultrasonic cleaner for a period of 15 minutes, rinsed with water, sonicated in water for another period of 15 minutes and air dried. The electrodeposition is carried out on a sample having a surface area of about 0.1 to about 1 cm$^2$ exposed to the solution and using the same type of cell than that utilized for the electrodeposition on an ITO on glass electrode. The cathodic current preferably ranges from 10 to 15 mA/cm$^2$. It has been noted that the Co(OH)$_2$ layers tend to better adhere to polymeric materials than to a glass material. Moreover, since the polymeric materials used are generally foldable, the electrodes of the invention which include a polymeric material substrate can be folded or rulled up, which makes them particularly interesting for the manufacture of low-cost solar cells.

Various electrodeposition times have been investigated in order to provide optimized electrodes. Interesting results have been obtained by electrodepositing the layer of Co(OH)$_2$ over a period of time ranging from 1 to 90 seconds. Preferably, the period of time ranges from 1 to 30 seconds. Such periods of time permit to better control the thickness of the layer and hence its transparency.

The thickness of the Co(OH)$_2$ layer has been measured by means of a micrometer and confirmed using a scanning electron microscope (SEM). The values range preferably from about 0.25 to about 4 µm.

2) Conversion of at Least a Portion of the Co(OH)$_2$ Layer into a CoS Layer

This second step is carried out by dipping the ITO on glass/Co(OH)$_2$ electrode obtained in step (1) into a solution comprising 1 M Na$_2$S, 1 M S and 1 M KOH. This solution is prepared by successively dissolving in water KOH, Na$_2$S and S. The dipping of the electrode is carried out over a period of time of about 30 minutes. When a CoS layer is formed, the color of the surface of the electrode changes from blue-green to black. After the conversion, the electrode is rinsed with nanopure water and then dried under vacuum for a period of about 12 hours.

Such a conversion can also be performed by dipping an electrode comprising a polymeric material having a layer of ITO and a layer of Co(OH)$_2$ thereon into a solution comprising 0.1 M Na$_2$S, 0.1 M S and 0.1 M NH$_4$OH. When such an electrode is used, the dipping is carried out over the same period of time (30 minutes) and after the conversion, the electrode is rinsed and dried under the same conditions than those given above.

When the Co(OH)$_2$ layer is very thin on the glass substrate or on the polymeric substrate, it is possible to obtain a substantially complete conversion of this layer into a CoS layer.

Figure 1:
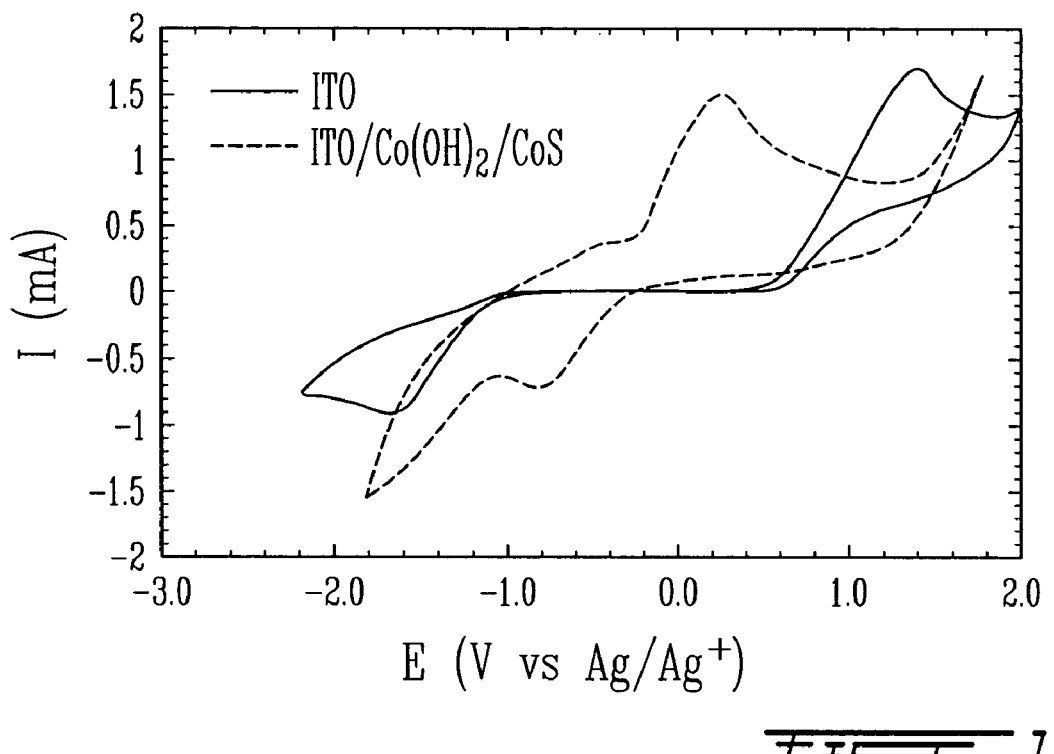
FIG. 1 shows cyclic voltammograms comparing an ITO on glass electrode with an ITO on glass/Co(OH)$_2$/CoS electrode according to a preferred embodiment of the invention.

In order to better characterize the above-mentioned electrodes, several cyclic voltammetry experiments have been carried out. FIG. 1 represents cyclic voltammograms comparing an ITO on glass electrode having an area of 0.50 cm$^2$ with an ITO on glass/Co(OH)$_2$/CoS electrode according to a preferred embodiment of the invention. A non-aqueous Ag/Ag$^+$ (1 M AgNO$_3$) electrode was used as reference electrode. The ITO on glass/Co(OH)$_2$/CoS electrode has an area of 0.40 cm$^2$. The Co(OH)$_2$ layer was electrodeposited on an ITO on glass electrode at a current density of 20 mA/cm$^2$ during 90 seconds. The reference and tested electrodes were immersed in a DMF/DMSO (60/40)/0.1 M TBAP solution comprising 50 mM of CsT and 5 mM of T$_2$ (redox couple), and the scanning speed was 100 mV/s. T$^-$ and T$_2$ are represented by the following formulae:

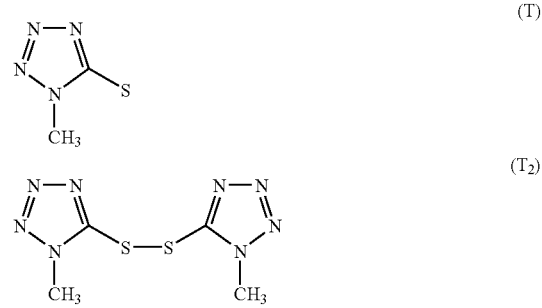

As it can be seen from FIG. 1, an ITO on glass electrode has been compared with an ITO on glass/Co(OH)$_2$/CoS electrode in order to determine the electrocatalytic properties of the latter. The comparison shows that the CoS in the ITO on glass/Co(OH)$_2$/CoS electrode acts as a very good electrocatalyst for the reduction of T$_2$. In particular, the reduction of T$_2$ is favored by 0.84 V and the oxidation of T$^-$ is favored by 1.12 V when using the CoS electrode instead of the ITO on glass electrode. The $E_{pc}$ and $E_{pa}$ of the CoS electrode are respectively −0.82 V et 0.25 V vs Ag/Ag$^+$. The $\Delta E_p$ of the latter is thus 1.07 V.

Figure 2:
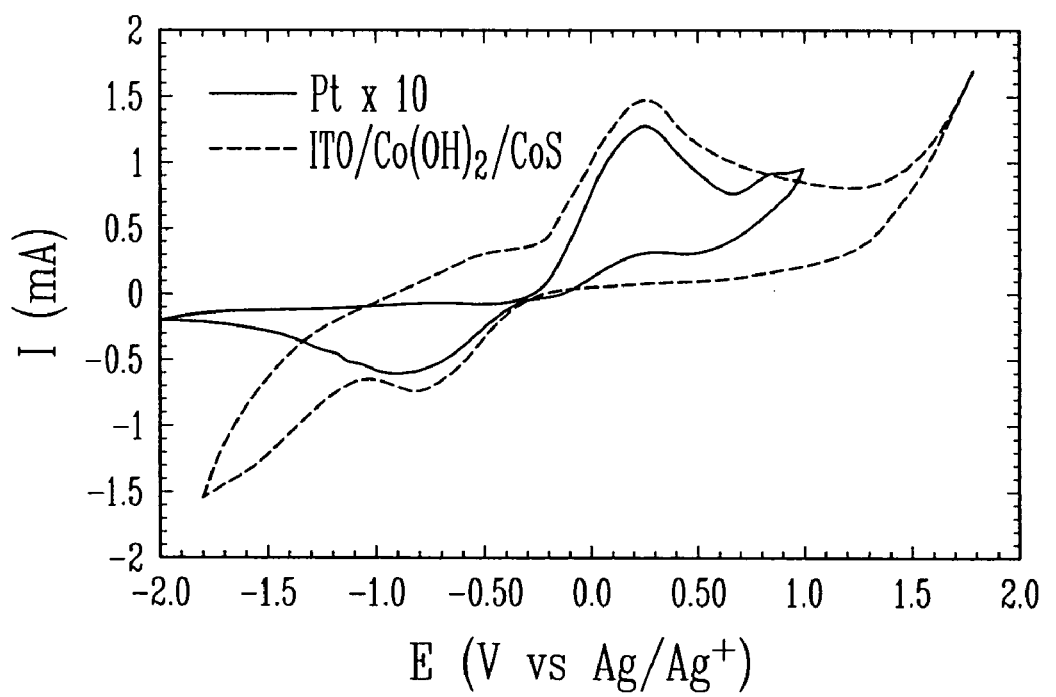
FIG. 2 shows other cyclic voltammograms comparing a Pt electrode with an ITO on glass/Co(OH)$_2$/CoS electrode according to a preferred embodiment of the invention.

FIG. 2 represents cyclic voltammograms comparing a Pt electrode having an area of 0.025 cm$^2$ with an ITO on glass/Co(OH)$_2$/CoS electrode according to a preferred embodiment of the invention. In this figure, the current relative to the Pt electrode was multiplied by a factor of 10 (Pt×10). A non-aqueous Ag/Ag$^+$ electrode was used as reference electrode. The ITO on glass/Co(OH)$_2$/CoS electrode has an area of 0.40 cm$^2$. The Co(OH)$_2$ layer was electrodeposited on an ITO on glass electrode at a current density of 20 mA/cm$^2$ during 90 seconds. The reference and tested electrodes were immersed in a DMF/DMSO (60/40)/1 0.1 M TBAP solution comprising 50 mM of CsT and 5 mM of T$_2$, and the scanning speed was 100 mV/s.

As it can be seen from FIG. 2, a Pt electrode has been compared with an ITO on glass/Co(OH)$_2$/CoS electrode in order to determine the electrocatalytic properties of the latter. This figure shows that the oxidation potential of the two electrodes is similar, whereas the CoS electrode is slightly more electrocatalytic (by 90 mV) for the reduction process.

Figure 3:
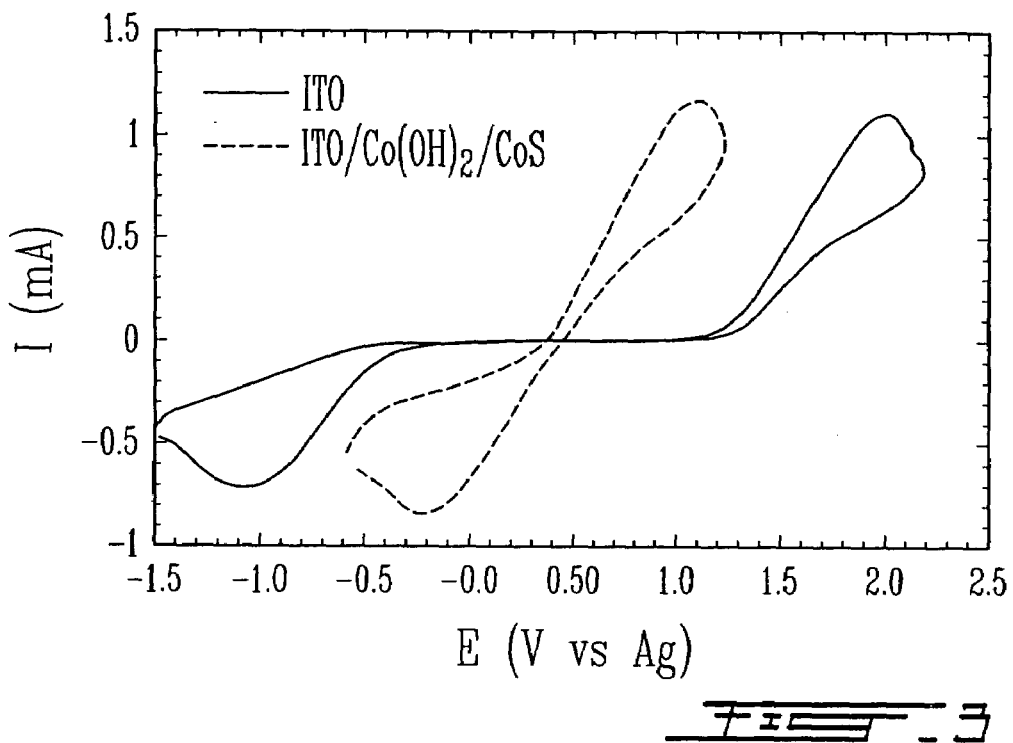
FIG. 3 shows still other cyclic voltammograms comparing an ITO on glass electrode with an ITO on glass/Co(OH)$_2$/CoS electrode according to a preferred embodiment of the invention.

FIG. 3 represents cyclic voltammograms comparing an ITO on glass electrode having an area of 0.50 cm$^2$ with an ITO on glass/Co(OH)$_2$/CoS electrode according to a preferred embodiment of the invention. An Ag wire was used as reference electrode. The ITO on glass/Co(OH)$_2$/CoS electrode has an area of 0.40 cm$^2$. The Co(OH)$_2$ layer was electrodeposited on an ITO on glass electrode at a current density of 20 mA/cm$^2$ during 1 second. Both electrodes were immersed in gel comprising 20% of PVdF and 80% of DMF/DMSO (60/40). The gel also comprises 50 mM of CsT and 5 mM of T$_2$, and the scanning speed was 100 mV/s. The gel electrolyte was prepared as described by Renard et al. in *Electrochim. Acta,* 48/7, 831 (2003).

Figure 4:
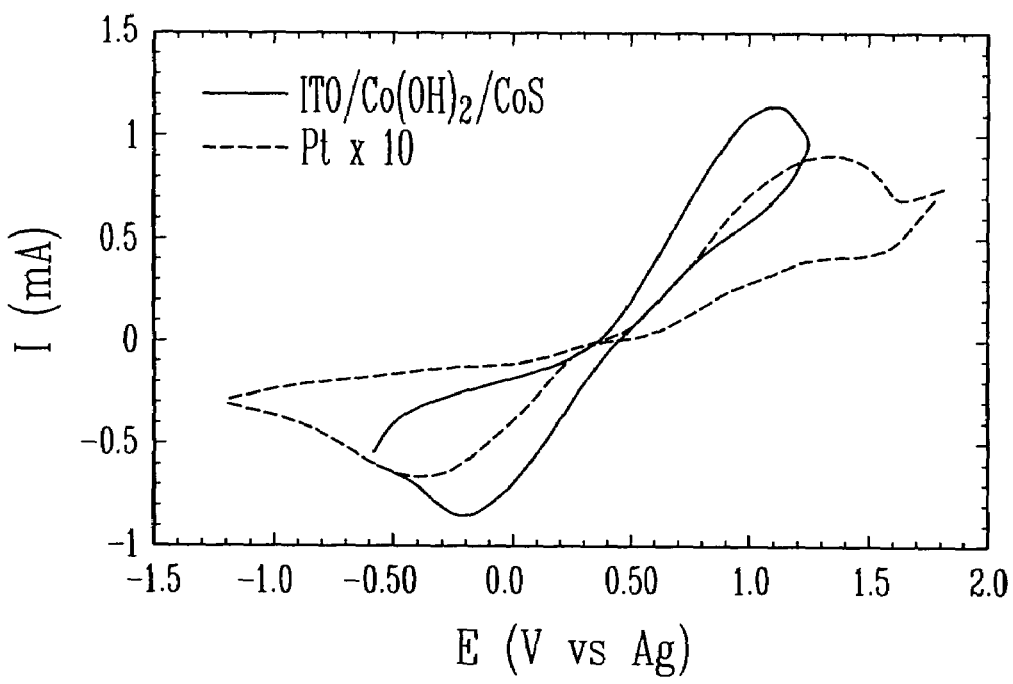
FIG. 4 shows further cyclic voltammograms comparing a Pt electrode with an ITO on glass/Co(OH)$_2$/CoS electrode according to a preferred embodiment of the invention.

FIG. 4 represents cyclic voltammograms comparing a Pt electrode having an area of 0.025 cm$^2$ with an ITO on glass/Co(OH)$_2$/CoS electrode according to a preferred embodiment of the invention. In this figure, the current relative to the Pt electrode was multiplied by a factor of 10 (Pt×10). An Ag wire was used as reference electrode. The ITO on glass/Co(OH)$_2$/CoS electrode has an area of 0.40 cm$^2$. The Co(OH)$_2$ layer was electrodeposited on an ITO on glass electrode at a current density of 20 mA/cm$^2$ during 1 second. Both electrodes were immersed in gel comprising 20% of PVdF and 80% of DMF/DMSO (60/40). The gel also comprises 50 mM of CsT and 5 mM of T$_2$, and the scanning speed was 100 mV/s.

As it can be seen from FIGS. 3 and 4, the ITO on glass/Co(OH)$_2$/CoS electrode has better electrocatalytic properties in a gel than in a liquid medium. The results obtained in FIGS. 3 and 4 are summarized in Table 1.

TABLE 1

| Electrodes | $E_{pa}$ (V vs Ag) | $E_{pc}$ (V vs Ag) | $\Delta E_p$ (V) |
|---|---|---|---|
| ITO on glass | 2.01 | −1.05 | 3.06 |
| Pt | 1.34 | −0.36 | 1.70 |
| ITO on glass/Co(OH)$_2$/CoS | 1.13 | −0.23 | 1.36 |

FIG. 5 represents the current-potential curve, obtained in darkness, of two Electrochemical Photovoltaic Cells: n-CdSe∥PVdF(20%)/DMF/DMSO DMF/DMSO (60/40)/1.34 M CsT/0.13 M T$_2$∥ITO on glass and n-CdSe∥PVdF(20%)/DMF/DMSO (60/40)/1.34 M CsT/0.13 M T$_2$∥ITO on glass/Co(OH)$_2$/CoS. The n-CdSe electrodes were prepared as described by Philias and Marsan in *Electrochim. Acta,* 44, 2915 (1999). The gel electrolyte was prepared as described by Renard et al. in *Electrochim. Acta,* 48/7, 831 (2003), but using the above redox species concentrations. EPC's were prepared in a glovebox. 60 μL of the gel electrolyte were put into the hole (2 cm$^2$) of a 100 μm thick paraffin film set at the surface of an ITO on glass or an ITO on glass/Co(OH)$_2$/CoS electrode. The n-CdSe electrode was then put in contact with the gel and a piece of glass was put on top of the assembly. Finally, the cell was sealed using epoxy glue. The Co(OH)$_2$ layer was electrodeposited on an ITO on glass electrode at a current density of 20 mA/cm$^2$ during 1 second. The potential measured (V) is the potential applied to the n-CdSe electrode and the scanning speed was 1 mV/s.

As it can be seen from FIG. 5, the rectification ratio ($|i_-|/i_+$) at 0.8 V increases from 1.0 (ITO on glass electrode) to 12.0 (ITO on glass/Co(OH)$_2$/CoS) which confirms that the quality of the junction is improved when using a CoS electrode.

FIG. 6 represents the current-potential curve, obtained under a polychromatic light (incident power density from a tungsten-halogen lamp: 100 mW/cm$^2$) of two Electrochemical Photovoltaic Cells: n-CdSe∥PVdF(20%)/DMF/DMSO (60/40)/1.34 M CsT/0.13 M T$_2$∥ITO on glass and n-CdSe∥PVdF(20%)/DMF/DMSO (60/40)/1.34 M CsT/0.13 M T$_2$∥ITO on glass/Co(OH)$_2$/CoS. The Co(OH)$_2$ layer was electrodeposited on an ITO on glass electrode at a current density of 20 mA/cm$^2$ during 1 second. The potential measured (V) is the potential applied to the n-CdSe electrode, the scanning speed was 10 mV/s and the light area was 1.3 cm$^2$.

As it can be seen from FIG. 6, the important increase of the photocurrent, when using the CoS electrode in the cell, means that the reduction of T$_2$ is improved in a significant manner. These results demonstrate that the use of a CoS electrode improves the catalytic performance of the cell.

FIG. 7 shows still further cyclic voltammograms demonstrating the influence of the deposition time of the Co(OH)$_2$ layer in an ITO on glass/Co(OH)$_2$/CoS electrode according to a preferred embodiment of the invention. The Co(OH)$_2$ layers were electrodeposited on an ITO on glass electrode at a current density of 20 mA/cm$^2$. The ITO on glass/Co(OH)$_2$/CoS electrodes have an area of 0.10 cm$^2$. An Ag wire was used as reference electrode. All the electrodes were immersed in a DMF/DMSO (60/40)/0.1 M TBAP solution comprising 50 mM of CsT and 5 mM of T$_2$, and the scanning speed was 100 mV/s.

As it can be seen from FIG. 7, in comparison with FIG. 1, the $\Delta E_p$ of the ITO on glass/Co(OH)$_2$/CoS electrode has been improved from 1.07 V (deposition time of 90 seconds) to 0.99 V (deposition time of 60 seconds), a difference of 80 mV. It can be seen that the $\Delta E_p$ is influenced by the deposition time of Co(OH)$_2$. These results are shown in Table 2.

TABLE 2

| Deposition time of Co(OH)$_2$ (seconds) | $\Delta E_p$ (V) |
|---|---|
| 1 | 0.94 |
| 30 | 0.95 |
| 60 | 0.99 |
| 90 | 1.07 |

FIG. 8 shows an XPS sulphur analysis comparison between a first electrode (an ITO on glass/Co(OH)$_2$ electrode) and a second electrode (an ITO on glass/Co(OH)$_2$/CoS electrode). The Co(OH)$_2$ layers were electrodeposited on an ITO on glass electrode at a current density of 20 mA/cm² during 30 seconds. The only peaks present in case of the first electrode are probably due to traces of sulphate used in the preparation of the latter. However, in the case of the second electrode, a peak at 162.4 eV (S $2p_{3/2}$ transition) and a peak at 163.5 eV (S $P_{1/2}$ transition) are observed and correspond to CoS. This analysis thus proves the existence of the CoS layer in the second electrode.

FIGS. 9 and 10 show, respectively, an X-ray diffraction pattern of an ITO on glass/Co(OH)₂ electrode and an X-ray diffraction pattern of a Co(OH)₂ powder. The ITO on glass/Co(OH)₂ electrode was prepared by electrodepositing a Co(OH)₂ layer on an ITO on glass electrode at 20 mA/cm² during 90 seconds. The Co(OH)₂ powder was obtained by reacting together Co(NO₃)₂ and KOH. These analyses have been performed in order to determine if the Co(OH)₂ layer electrodeposited on the ITO on glass electrode had different characteristics than Co(OH)₂ obtained in powder form. The results obtained in FIGS. 9 and 10 are summarized in tables 3 and 4, respectively.

TABLE 3

| 2θ observed (°) | d-spacing calculated (Å) | Relative intensity observed (%) | Standard d-spacing (Å) | Standard relative intensity (%) | (hkl plane) |
| --- | --- | --- | --- | --- | --- |
| 22.3 | 4.63 | 66 | 4.66 | 70 | (001) |
| 38.1 | 2.74 | 44 | 2.76 | 40 | (100) |
| 44.5 | 2.36 | 100 | 2.38 | 100 | (101) |
| 60.6 | 1.77 | 42 | 1.78 | 70 | (102) |
| 68.6 | 1.59 | 28 | 1.60 | 50 | (110) |
| 73.1 | 1.50 | 19 | 1.51 | 40 | (111) |
| 83.1 | 1.35 | 6 | 1.36 | 40 | (103) |
| 85.4 | 1.32 | 6 | 1.33 | 40 | (201) |

TABLE 4

| 2θ observed (°) | d-spacing calculated (Å) | Relative intensity observed (%) | Standard d-spacing (Å) | Standard relative intensity (%) | (hkl plane) |
| --- | --- | --- | --- | --- | --- |
| 22.2 | 4.65 | 73 | 4.66 | 70 | (001) |
| 38.0 | 2.75 | 72 | 2.76 | 40 | (100) |
| 44.4 | 2.37 | 100 | 2.38 | 100 | (101) |
| 60.5 | 1.78 | 31 | 1.78 | 70 | (102) |
| 68.5 | 1.59 | 38 | 1.60 | 50 | (110) |
| 73.0 | 1.50 | 19 | 1.51 | 40 | (111) |
| 83.0 | 1.35 | 8 | 1.36 | 40 | (103) |
| 85.3 | 1.32 | 8 | 1.33 | 40 | (201) |

According to FIG. 10 and table 4, it can be seen that the d-spacings obtained concerning the Co(OH)₂ powder are similar to those reported in the scientific literature. Also, a preferential orientation of the (100) plane was noted. It can be concluded from FIG. 10 that Co(OH)₂ has a hexagonal phase.

In FIGS. 9 and 10 the position of the peaks is identical, which demonstrate that the positions are the same even if Co(OH)₂ is prepared according to different methods. It can also be seen from the latter two figures that the peaks of the ITO on glass/Co(OH)₂ electrode (FIG. 9) are generally more intense and narrower than the peaks of the Co(OH)₂ powder (FIG. 10). This difference indicates that electrodeposited Co(OH)₂ is more cristalline than the Co(OH)₂ powder. As example, the (101) peak in FIG. 9 has an intensity of 790 Cps, whereas the (101) peak in FIG. 10 has an intensity of 510 Cps. By comparing the peaks of FIGS. 9 and 10, and by using the Scherrer relation it is possible to quantitatively establish that the crystal grains in the electrodeposited Co(OH)2 are bigger.

The visible absorption spectra of an ITO on glass electrode (FIG. 11), different ITO on glass/Co(OH)₂/CoS electrodes (FIG. 12) and of a PVdF(20%)/DMF/DMSO (60/40)/1.34 M CsT/0.13 M T₂ gel electrolyte having a thickness of 100 μm (FIG. 13) are analyzed in table 5, which give the percentage of transmitted visible polychromatic light as obtained using a radiometer.

TABLE 5

| Analyzed material | Visible transmitted light (%) |
| --- | --- |
| ITO on glass electrode | 75.2 ± 0.3 |
| ITO on glass/Co(OH)₂/CoS electrode | 67.6 |
| Co(OH)₂/CoS layers | 89.9 ± 0.5 |
| d.p.: 1 second at 20 mA/cm² | |
| ITO on glass/Co(OH)₂/CoS electrode | 65.9 |
| Co(OH)₂/CoS layers | 87.6 ± 0.8 |
| d.p.: 1 second at 30 mA/cm² | |
| ITO on glass/Co(OH)₂/CoS electrode | 62.0 |
| Co(OH)₂/CoS layers | 82.4 ± 0.6 |
| d.p.: 2 seconds at 20 mA/cm² | |
| ITO on glass/Co(OH)₂/CoS electrode | 46.4 |
| Co(OH)₂/CoS layers | 61.7 ± 0.4 |
| d.p.: 3 seconds at 30 mA/cm² | |
| ITO on glass/Co(OH)₂/CoS electrode | 29.4 |
| Co(OH)₂/CoS layers | 39.1 ± 0.4 |
| d.p.: 5 seconds at 30 mA/cm² | |
| PVdF(20%)/DMF/DMSO (60/40)/1.34 M CsT/0.13 M T₂ gel electrolyte | 98.9 ± 0.1 | d.p. = deposition time of Co(OH)₂

As it can be seen from table 5, visible light is transmitted up to 68% (transmission of 90% for the Co(OH)₂/CoS layers) when using an ITO on glass/Co(OH)₂/CoS electrode, which has been prepared by electrodepositing Co(OH)₂ over a period of 1 second. From FIG. 12 it can also be seen that the maximum absorbance is very low, i.e. almost nonexistent. These results demonstrate that the Co(OH)₂ deposition time strongly influences the light transmission of the prepared electrode and that optimal results are obtained with a deposition time of 1 second at 20 mA/cm². These results also demonstrate that these specific Co(OH)₂ and CoS layers have a high degree of transparency.

When using an ITO on polymer/Co(OH)₂/CoS electrode, the polychromatic visible light transmitted is substantially the same than that in the case of an ITO on glass/Co(OH)₂/CoS electrode. It is to be noted, however, as pointed out above, that the current density preferably ranges from 15 to 30 mA/cm² and from 10 to 15 mA/cm² when using ITO on glass and ITO on polymer, respectively.

FIG. 14 represents cyclic voltammograms comparing an ITO on glass electrode having a surface area of 0.1 cm² with an ITO on glass/Co(OH)₂/CoS electrode according to a preferred embodiment of the invention. In this figure, the current (I) relative to the ITO on glass/Co(OH)₂/CoS electrode was divided by a factor of 3.5 (I/3.5). A silver wire was used as a reference electrode. The ITO on glass/Co(OH)₂/CoS electrode has a surface area of 0.1 cm². The Co(OH)₂ layer was electrodeposited on an ITO on glass electrode at a current density of 20 mA/cm² during 90 seconds using a solution containing 1 M of NaCl. The reference and the tested electrodes were immersed in a DMF/DMSO (60/40)/0.1 M TBAP solution comprising 50 mM of KI and 5 mM of 12 (redox couple), and the scanning speed was 100 mV/s.

As it can be seen from FIG. 14, an ITO on glass electrode has been compared with an ITO on glass/Co(OH)₂/CoS electrode in order to determine the electrocatalytic properties of the latter. The comparison shows that the ITO on glass/Co (OH)₂/CoS electrode acts as a very good electrocatalyst for the reduction of triiodide. In particular, the reduction of $I_3^-$ is favored by 0.86 V and the oxidation of $I^-$ is favored by 0.78 V when using the CoS electrode instead of the ITO on glass electrode. The $E_{pc1}$ and $E_{pa1}$ of the CoS electrode are respectively 0.25 V and 1.01 V vs Ag. The $\Delta E_{p1}$ of the latter is thus 0.76 V instead of 2.40 V for ITO on glass.

TABLE 6

| Electrode | $E_{pc1}$ (V) | $E_{pa1}$ (V) | $\Delta E_{p1}$ (V) | $E_{pc2}$ (V) | $E_{pa2}$ (V) | $\Delta E_{p2}$ (V) |
|---|---|---|---|---|---|---|
| ITO | −0.61 | 1.79 | 2.40 | — | — | — |
| ITO/Co(OH)₂/CoS | 0.25 | 1.01 | 0.76 | 0.97 | 1.52 | 0.55 |

FIG. 15 shows cyclic voltammogramms demonstrating the influence of the NaCl concentration in the electrodepositing solution used for the electrodeposition of the Co(OH)₂ layers on ITO on glass, to prepare ITO on glass/Co(OH)₂/CoS electrodes. In this figure, the currents (I) relative to the ITO on glass/Co(OH)₂/CoS electrodes prepared using a solution containing 1.5 and 2 M NaCl were multiplied by a factor of 1.5 (I×1.5). The Co(OH)₂ layers were electrodeposited on ITO on glass electrodes at a current density of 20 mA/cm² during 90 seconds. The ITO on glass/Co(OH)₂/CoS electrodes have a surface area of 0.1 cm². A Ag wire was used as a reference electrode. All the electrodes were immersed in a DMF/DMSO (60/40)/0.1 M TBAP solution comprising 50 mM of KI and 5 mM of I₂, and the scanning speed was 100 mV/s.

As it can be seen from FIG. 15, the $\Delta E_{p1}$ of the ITO on glass/Co(OH)₂/CoS electrode has been improved from 0.76 V (NaCl 1 M) to 0.56 V (NaCl 2 M), a difference of 0.20 V. This difference is mainly due to the less positive value of $E_{pa1}$ associated to the electrode prepared using NaCl at a higher concentration. The same downward trend is observed for $\Delta E_{p2}$, going from 0.55 V (NaCl 1 M) to 0.28 V (NaCl 2 M), a difference of 0.27 V. It can be seen that both $\Delta E_p$ are influenced by the sodium chloride concentration in the electrodepositing solution. These results are shown in Table 7.

TABLE 7

| Electrode | $E_{pc1}$ (V) | $E_{pa1}$ (V) | $\Delta E_{p1}$ (V) | $E_{pc2}$ (V) | $ZE_{pa2}$ (V) | $\Delta E_{p2}$ (V) |
|---|---|---|---|---|---|---|
| ITO/Co(OH)₂/CoS - 1 M NaCl | 0.25 | 1.01 | 0.76 | 0.97 | 1.52 | 0.55 |
| ITO/Co(OH)₂/CoS - 1.5 M NaCl | 0.23 | 0.82 | 0.59 | 0.96 | 1.28 | 0.32 |
| ITO/Co(OH)₂/CoS - 2 M NaCl | 0.26 | 0.82 | 0.56 | 0.97 | 1.25 | 0.28 |

FIG. 16 represents cyclic voltammograms comparing a Pt electrode having a surface area of 0.02 cm² with an ITO on glass/Co(OH)₂/CoS electrode according to a preferred embodiment of the invention. In this figure, the current (I) relative to the ITO on glass/Co(OH)₂/CoS electrode prepared using a solution containing 2 M NaCl was multiplied by a factor of 1.5 (I×1.5), and that of the Pt electrode was multiplied by a factor of 6.5 (I×6.5). The Co(OH)₂ layer was electrodeposited on an ITO on glass electrode at a current density of 20 mA/cm² during 90 seconds. The concentration of NaCl in the electrodepositing solution was 2 M. The ITO on glass/Co(OH)₂/CoS electrodes have a surface area of 0.1 cm². A Ag wire was used as a reference electrode. All the electrodes were immersed in a DMF/DMSO (60/40)/0.1 M TBAP solution comprising 50 mM of KI and 5 mM of I₂, and the scanning speed was 100 mV/s.

As it can be seen from FIG. 16, a Pt electrode has been compared with an ITO on glass/Co(OH)₂/CoS electrode in order to determine the electrocatalytic properties of the latter. According to this figure and Table 8, the iodide oxidation potential for the two electrodes (the redox process that occurs at the most cathodic potential) is similar, whereas the CoS electrode is more electrocatalytic (by 90 mV) for the reduction of $I_3^-$. The $\Delta E_{p1}$ of the latter is 110 mV smaller than the one for Pt. Inversely, for the most anodic redox process ($A_2/C_2$), the reduction potential for the two electrodes is similar, whereas the Pt electrode is more electrocatalytic (110 mV) for the oxidation process. The $\Delta E_{p2}$ of the latter is 60 mV smaller than the one for the CoS electrode.

TABLE 8

| Electrode | $E_{pc1}$ (V) | $E_{pa1}$ (V) | $\Delta E_{p1}$ (V) | $E_{pc2}$ (V) | $E_{pa2}$ (V) | $\Delta E_{p2}$ (V) |
|---|---|---|---|---|---|---|
| ITO/Co(OH)₂/CoS | 0.26 | 0.82 | 0.56 | 0.96 | 1.28 | 0.32 |
| Pt | 0.17 | 0.84 | 0.67 | 0.91 | 1.17 | 0.26 |

FIG. 17 represents cyclic voltammograms comparing an ITO on glass electrode having a surface area of 0.07 cm² with an ITO on glass/Co(OH)₂/CoS electrode (0.09 cm²) according to a preferred embodiment of the invention. A silver wire was used as a reference electrode. The Co(OH)₂ layer was electrodeposited on an ITO on glass electrode at a current density of 20 mA/cm² during 30 seconds using a solution containing 1 M of NaCl. The reference and the tested electrodes were immersed in a EMI-TFSI solution comprising 0.163 M of EMI-I and 10 mM of I₂. The scanning speed was 100 mV/s.

As it can be seen from FIG. 17, an ITO on glass electrode has been compared with an ITO on glass/Co(OH)₂/CoS electrode in order to determine the electrocatalytic properties of the latter. The comparison shows that the ITO on glass/Co(OH)₂/CoS electrode acts as a very good electrocatalyst for the reduction of triiodide. In particular, the reduction of $I_3^-$ is favored by 0.74 V and the oxidation of $I^-$ is favored by 0.77 V when using the CoS electrode instead of the ITO electrode. The $E_{pc1}$ and $E_{pa1}$ of the CoS electrode are respectively 0.19 V and 0.40 V vs Ag (Table 9). The $\Delta E_{p1}$ of the latter is thus 0.21 V instead of 1.72 V for ITO.

TABLE 9

| Electrode | $E_{pc1}$ (V) | $E_{pa1}$ (V) | $\Delta E_{p1}$ (V) | $E_{pc2}$ (V) | $E_{pa2}$ (V) | $\Delta E_{p2}$ (V) |
|---|---|---|---|---|---|---|
| ITO on glass | −0.55 | 1.17 | 1.72 | — | — | — |
| ITO/Co(OH)₂/CoS | 0.19 | 0.40 | 0.21 | 0.67 | 0.84 | 0.17 |

FIG. 18 shows other cyclic voltammograms comparing a Pt electrode having a surface area of 0.025 cm$^2$ with an ITO on glass/Co(OH)$_2$/CoS electrode (0.09 cm$^2$) according to a preferred embodiment of the invention. A Ag wire was used as a reference electrode. The Co(OH)$_2$ layer was electrodeposited on an ITO on glass electrode at a current density of 20 mA/cm$^2$ during 30 seconds. The NaCl concentration in the electrodepositing solution was 1 M. All the electrodes were immersed in a EMI-TFSI solution comprising 0.163 M of EMI-I and 10 mM of I$_2$. The scanning speed was 100 mV/s.

As it can be seen from FIG. 18, a Pt electrode has been compared with an ITO on glass/Co(OH)$_2$/CoS electrode in order to determine the electrocatalytic properties of the latter. This figure shows that the oxidation and reduction potentials of the two electrodes are similar (see also Table 10). However, the CoS electrode demonstrates a higher current density than Pt, which is of a great interest.

TABLE 10

| Electrode | $E_{pc1}$ (V) | $E_{pa1}$ (V) | $\Delta E_{p1}$ (V) | $E_{pc2}$ (V) | $E_{pa2}$ (V) | $\Delta E_{p2}$ (V) |
|---|---|---|---|---|---|---|
| Pt | 0.23 | 0.41 | 0.18 | 0.69 | 0.85 | 0.16 |
| ITO/Co(OH)$_2$/CoS | 0.19 | 0.40 | 0.21 | 0.67 | 0.84 | 0.17 |

FIG. 19 shows still further cyclic voltammograms demonstrating the influence of the deposition time of the Co(OH)$_2$ layer on ITO on glass, to prepare ITO on glass/Co(OH)$_2$/CoS electrodes according to a preferred embodiment of the invention. The Co(OH)$_2$ layers were electrodeposited on an ITO on glass electrode at a current density of 20 mA/cm$^2$. The ITO on glass/Co(OH)$_2$/CoS electrodes have a surface area of 0.09 cm$^2$ for electrodeposition time of 30 and 60 seconds, and 0.06 cm$^2$ for an electrodeposition time of 90 seconds. A Ag wire was used as a reference electrode. All the electrodes were immersed in a EMI-TFSI solution comprising 0.163 M of EMI-I and 10 mM of I$_2$. The scanning speed was 100 mV/s.

As it can be seen from FIG. 19, the ITO on glass/Co(OH)$_2$/CoS electrodes, which have been prepared by electrodepositing Co(OH)$_2$ for 60 or 90 seconds, show higher current densities than the electrode prepared using an electrodeposition time of 30 seconds. These results demonstrate that the roughness factor increases with the electrodeposition time. Regarding the oxidation and reduction potentials, a similarity is observed for the three electrodes (Table 11).

TABLE 11

| Electrode | $E_{pc1}$ (V) | $E_{pa1}$ (V) | $\Delta E_{p1}$ (V) | $E_{pc2}$ (V) | $E_{pa2}$ (V) | $\Delta E_{p2}$ (V) |
|---|---|---|---|---|---|---|
| ITO/Co(OH)$_2$/CoS 30 seconds | 0.19 | 0.40 | 0.21 | 0.67 | 0.84 | 0.17 |
| ITO/Co(OH)$_2$/CoS 60 seconds | 0.21 | 0.43 | 0.22 | 0.57 | 0.81 | 0.24 |
| ITO/Co(OH)$_2$/CoS 90 seconds | 0.23 | 0.41 | 0.18 | 0.65 | 0.83 | 0.18 |

FIG. 20 and 21 represent cyclic voltammograms comparing an ITO on polymer (polyethylene terephthalate) electrode having a surface area of 0.05 cm$^2$ (FIG. 20) with an ITO on polymer (polyethylene terephthalate)/Co(OH)$_2$/CoS electrode (0.05 cm$^2$) (FIG. 21) according to a preferred embodiment of the invention. A silver wire was used as a reference electrode. The Co(OH)$_2$ layer was electrodeposited on an ITO on polymer electrode at a current density of 15 mA/cm$^2$ during 90 seconds using a solution containing 1 M of NaCl. The reference and the tested electrodes were immersed in a EMI-TFSI solution comprising 0.163 M of EMI-I and 10 mM of I$_2$. The scanning speed was 100 mV/s.

As it can be seen from FIG. 20 and 21, an ITO on polymer electrode has been compared with an ITO on polymer/Co(OH)$_2$/CoS electrode in order to determine the electrocatalytic properties of the latter. The comparison shows that the ITO on polymer/Co(OH)$_2$/CoS electrode acts as a very good electrocatalyst for the reduction of triiodide. In particular, the reduction of I$_3^-$ is favored by 1.1 V and the oxidation of I$^-$ is favored by 0.65 V when using the CoS electrode instead of the ITO electrode. The $E_{pc1}$ and $E_{pa1}$ of the CoS electrode are respectively 0.70 V and 1.15 V vs Ag (Table 12). The $\Delta E_{p1}$ of the latter is thus 0.45 V instead of 2.20 V for ITO.

TABLE 12

| Electrode | $E_{pc1}$ (V) | $E_{pa1}$ (V) | $\Delta E_{p1}$ (V) | $E_{pc2}$ (V) | $E_{pa2}$ (V) | $\Delta E_{p2}$ (V) |
|---|---|---|---|---|---|---|
| ITO on polymer | −0.40 | 1.80 | 2.20 | — | — | — |
| ITO/Co(OH)$_2$/CoS | 0.70 | 1.15 | 0.45 | 1.50 | 1.75 | 0.25 |

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. An electrode comprising:
   a polymer substrate;
   a first layer disposed on said substrate, said layer comprising indium tin oxide or fluorine-doped SnO$_2$; and
   a second layer disposed on said first layer, said second layer comprising CoS,
   wherein said first and second layers are each at least substantially transparent,
   said electrode being obtained by converting at least a portion of a Co(OH)$_2$ layer deposited on said first layer into CoS so as to obtain said second layer by contacting said layer of Co(OH)$_2$ with a basic composition comprising NH$_4$OH and at least one source of sulfur.

2. The electrode of claim 1, wherein said polymer substrate comprises a polymer selected from the group consisting of polycarbonate, acetate, polyethylene terephthalate, polyethylene naphthalate and polyimide.

3. The electrode of claim 1, wherein said second layer has a thickness of less than about 5 µm.

4. The electrode of claims 1, wherein said electrode has a transmittance of visible polychromatic light of at least 35%.

5. The electrode of claim 1, wherein said electrode has a transmittance of visible polychromatic light of at least 60%.

6. An indium tin oxide polymer electrode having thereon an at least substantially transparent layer comprising CoS, said layer being obtained by electrodepositing $Co(OH)_2$ on said indium tin oxide polymer electrode and converting at least a portion of said $Co(OH)_2$ into CoS by contacting said $Co(OH)_2$ with a basic composition comprising $NH_4OH$ and at least one source of sulfur, thereby obtaining said polymer electrode which is suitable for use in a photovoltaic cell.

7. The electrode of claim 6, wherein said obtained electrode has a $Co(OH)_2$ layer disposed between said indium tin oxide polymer electrode and said CoS layer.

8. The electrode of claim 7, wherein said $Co(OH)_2$ layer is substantially transparent.

9. The electrode of 7, wherein said $Co(OH)_2$ layer has a thickness of less than about 5 µm.

10. The electrode of claim 7, wherein said $Co(OH)_2$ layer has a thickness of about 0.25 to about 4 µm.

11. The electrode of claim 6, wherein said electrode has a transmittance of visible polychromatic light of at least 35%.

12. The electrode of claim 6, wherein said electrode has a transmittance of visible polychromatic light of at least 60%.

13. An electrode comprising:
a polymer substrate;
a first layer disposed on said substrate, said first layer comprising indium tin oxide or fluorine-doped $SnO_2$;
a second layer disposed on said first layer, said second layer comprising $Co(OH)_2$; and
a third layer disposed on said second layer, said third layer comprising CoS,
wherein said first, second and third layers are each at least substantially transparent,
said electrode being obtained by converting a portion of $Co(OH)_2$ comprised in said second layer into CoS so as to obtain said third layer by contacting said $Co(OH)_2$ with a basic composition comprising $NH_4OH$ and at least one source of sulfur.

14. The electrode of claim 13, wherein said polymer substrate comprises a polymer selected from the group consisting of polycarbonate, acetate, polyethylene terephthalate, polyethylene naphthalate and polyimide.

15. The electrode of claim 13, wherein said second layer has a thickness of less than about 5 µm.

16. The electrode of claim 13, wherein said second layer has a thickness of about 0.25 to about 4 µm.

17. The electrode of claim 13, wherein said second layer has a thickness of about 0.5 to about 2 µm.

18. The electrode of claim 13, wherein said electrode has a transmittance of visible polychromatic light of at least 35%.

19. The electrode of claim 13, wherein said electrode has a transmittance of polychromatic light of at least 45%.

20. The electrode of claims 13, wherein said electrode has a transmittance of visible polychromatic light of at least 60%.

21. A photovoltaic cell comprising an electrode as defined in claim 1.

22. A photovoltaic cell comprising an electrode as defined in claim 3.

23. A photovoltaic cell comprising an anode, electrolyte and, as a cathode, an electrode as defined in claim 1.

24. The photovoltaic cell of claim 23, wherein said anode comprises n-CdSe.

25. The photovoltaic cell of claim 23, wherein said electrolyte comprises a redox couple together with a solvent, a polymer, a gel or a combination thereof.

26. The photovoltaic cell of claim 25, wherein said redox couple is $R_1SM/(R_1S)_2$ in which:
M is a metal selected from the group consisting of Li, Na, K and Cs;
$R_1S^-$ is a thiolate and $(R_1S)_2$ is a corresponding disulfide wherein $R_1$ is selected from the group consisting of

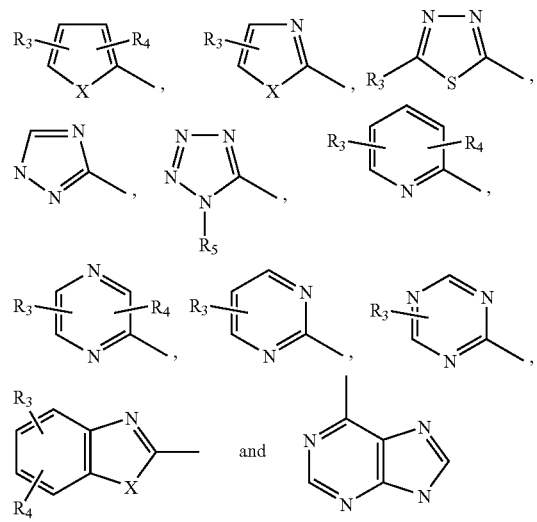

wherein
$R_3$ and $R_4$ are same or different and selected from the group consisting of a hydrogen atom, halogen atom, $—NO_2$, $—OH$, $—CF_3$ $—COR_6$, $—COOH$, $—COOR_6$, $—NHR_5$, $C_2$-$C_8$ alkenyl, $C_1$-$C_6$ alkoxy, $C_1$-$C_8$ alkyl, $C_2$-$C_8$ alkynyl, $C_6$-$C_{20}$ aralkyl, $C_6$-$C_{12}$ aryl, $C_3$-$C_8$ cycloalkyl and $C_2$-$C_{12}$ heteroaryl comprising 1 to 4 heteroatoms selected from the group consisting of N, O and S,
$R_5$ is a $C_1$-$C_8$ alkyl, $C_6$-$C_{12}$ aryl, $C_3$-$C_8$ cycloalkyl, $C_2$-$C_{12}$ heteroaryl comprising 1 to 4 heteroatoms selected from the group consisting of N, O and S, or any suitable protecting group for a nitrogen atom,
$R_6$ is a $C_1$-$C_8$ alkyl, or a $C_3$-$C_8$ cycloalkyl, and
X is N, O or S.

27. The photovoltaic cell of claim 25, wherein said redox couple is of formula $M^+I^-/I_3^-$ or $M^+I^-/I_2$, wherein $M^+$ is a metal selected from the group consisting of $Li^+$, $Na^+$, $K^+$, $Rb^+$ and $Cs^+$.

28. The photovoltaic cell of claim 25, wherein said redox couple is of formula $T^+I^-/I_3^-$ or $T^+I^-/I_2$, wherein $T^+$ is selected from the group consisting of:

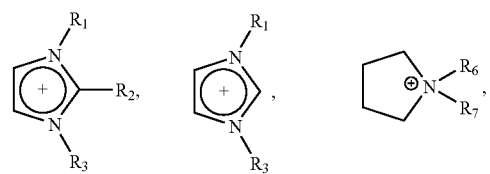

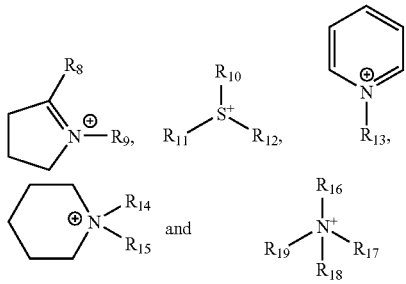

wherein:
- $R_1$ and $R_3$ are same or different and selected from the group consisting of $C_1$-$C_9$ alkyl and benzyl;
- $R_2$ is a $C_1$-$C_9$ alkyl or H;
- $R_4$ and $R_5$ are same or different and represent a $C_1$-$C_6$ alkyl;
- $R_6$ and $R_7$ are same or different and selected from the group consisting of a hydrogen atom and a $C_1$-$C_7$ alkyl;
- $R_8$ and $R_9$ are same or different and selected from the group consisting of hydrogen atom and $C_1$-$C_4$ alkyl;
- $R_{10}$, $R_{11}$ and $R_{12}$ are same or different and represent a $C_1$-$C_{12}$ alkyl;
- $R_{13}$ is selected from the group consisting of a hydrogen atom, a halogen atom and a $C_1$-$C_{18}$ alkyl;
- $R_{14}$ and $R_{15}$ are same or different and represent a $C_1$-$C_3$ alkyl; and
- $R_{16}$, $R_{17}$, $R_{18}$ and $R_{19}$ are same or different and selected from the group consisting of hydrogen atom, $C_1$-$C_{12}$ alkyl, $C_2$-$C_6$ alkoxyalkyl, $C_3$ alkenyl and $C_3$ alkynyl.

29. A method for reducing disulfides into thiolates comprising the step of electrochemically reducing said disulfides by means of an electrode as defined in claim 1.

30. A method for oxidizing thiolates into disulfides comprising the step of electrochemically oxidizing sand thiolates by means of an electrode as defined in claim 1.

31. A method for catalyzing oxidation and reduction reactions of a redox couple of formula $R_1SM/(R_1S)_2$, comprising the step of submitting said redox couple to an electrical current between at least two electrodes wherein at least one of said electrodes is an electrode as defined in claim 1, and wherein
- M is a metal selected from the group consisting of Li, Na, K and Cs;
- $R_1S$ is a thiolate and $(R_1S)_2$ is a corresponding disulfide wherein $R_1$ is selected from the group consisting of

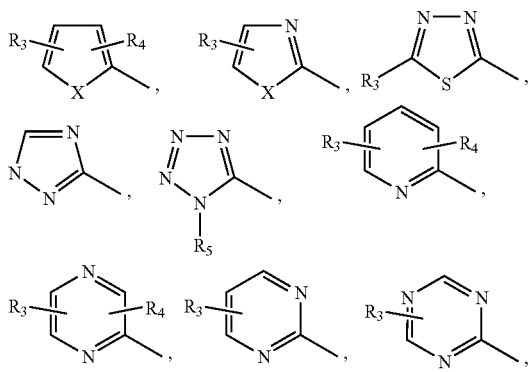

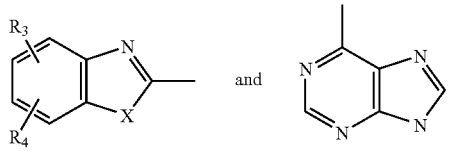

wherein
- $R_3$ and $R_4$ are same or different and selected from the group consisting of a hydrogen atom, halogen atom, —$NO_2$, —OH, —$CF_3$—$COR_6$, —COOH, —$COOR_6$, —$NHR_5$, $C_2$-$C_8$ alkenyl, $C_1$-$C_6$ alkoxy, $C_1$-$C_8$ alkyl, $C_2$-$C_8$ alkynyl, $C_6$-$C_{20}$ aralkyl, $C_6$-$C_{12}$ aryl, $C_3$-$C_8$ cycloalkyl and $C_2$-$C_{12}$ heteroaryl comprising 1 to 4 heteroatoms selected from the group consisting of N, O and S,
- $R_5$ is a $C_1$-$C_8$ alkyl, $C_6$-$C_{12}$ aryl, $C_3$-$C_8$ cycloalkyl, $C_2$-$C_{12}$ heteroaryl comprising 1 to 4 heteroatoms selected from the group consisting of N, O and S, or any suitable protecting group for a nitrogen atom,
- $R_6$ is a $C_1$-$C_8$ alkyl, or a $C_3$-$C_8$ cycloalkyl, and
- X is N, O or S.

32. A method for reducing a triiodide ($I_3^-$) or iodine ($I_2$) into an iodide ($I^-$) comprising the step of electrochemically reducing said triiodide or iodine by means of at least one electrode comprising:
- a non-conductive substrate;
- a first layer disposed on said substrate, said first layer comprising indium tin oxide or fluorine-doped $SnO_2$;
- optionally a second layer disposed on said first layer, said second layer comprising $Co(OH)_2$; and
- a third layer disposed on said first layer or on said second layer when said second layer is present in said electrode, said third layer comprising CoS, wherein said first, second and third layers are each at least substantially transparent.

33. A method for catalyzing oxidation and reduction reactions of a redox couple of formula $M^+I^-/I_3^-$, $M^+I^-/I_2$, $T^{30} I^-/I_3^-$ or $T^+I^-/I_2$ comprising the step of submitting said redox couple to an electrical current between at least two electrodes wherein at least one of said electrodes is an electrode comprising:
- a non-conductive substrate;
- a first layer disposed on said substrate, said first layer comprising indium tin oxide or fluorine-doped $SnO_2$;
- optionally a second layer disposed on said first layer, said second layer comprising $Co(OH)_2$; and
- a third layer disposed on said first layer or on said second layer when said second layer is present in said electrode, said third layer comprising CoS, wherein said first, second and third layers are each at least substantially transparent,
wherein $M^{30}$ is a metal selected from the group consisting of $Li^+$, $Na^+$, $K^+$, $Rb^+$ and $Cs^+$
and wherein $T^+$ is selected from the group consisting of:

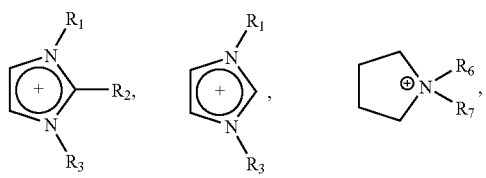

-continued

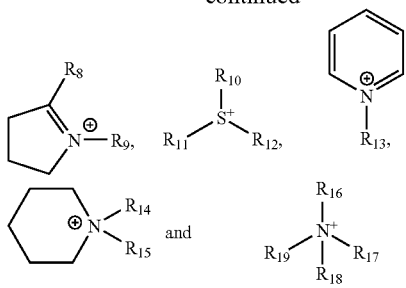

wherein:
$R_1$ and $R_3$ are same or different and selected from the group consisting of $C_1$-$C_9$ alkyl and benzyl;
$R_2$ is a $C_1$-$C_9$ alkyl or H;
$R_4$ and $R_5$ are same or different and represent a $C_{1-6}$ alkyl;
$R_6$ and $R_7$ are same or different and selected from the group consisting of a hydrogen atom and a $C_1$-$C_7$ alkyl;
$R_8$ and $R_9$ are same or different and selected from the group consisting of hydrogen atom and $C_1$-$C_4$ alkyl;
$R_{10}$, $R_{11}$ and $R_{12}$ are same or different and represent a $C_1$-$C_{12}$ alkyl;
$R_{13}$ is selected from the group consisting of a hydrogen atom, a halogen atom and a $C_1$-$C_{18}$ alkyl;
$R_{14}$ and $R_{15}$ are same or different and represent a $C_1$-$C_3$ alkyl; and
$R_{16}$, $R_{17}$, $R_{18}$ and $R_{19}$ are same or different and selected from the group consisting of hydrogen atom, $C_1$-$C_{12}$ alkyl, $C_2$-$C_6$ alkoxyalkyl, $C_3$ alkenyl and $C_3$ alkynyl.

34. The method of claim 33, wherein said redox couple is of formula $M^+I^-/I_3^-$ or $M^+I^-/I_2$, and wherein $M^+$ is $Li^+$, $Na^+$, or $K^+$.

35. The method of claim 33, wherein said at least one electrode comprises said second layer.

36. The method of claim 33, wherein said second layer is absent in said at least one electrode.

37. The method of claim 33, wherein said redox couple is of formula $T^+I^-/I_3^-$ or $T^+I^-/I_2$, and wherein $T^+$ is

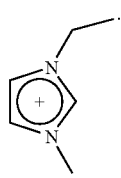

38. The electrode of claim 1, wherein said at least one source of sulfur is chosen from S, $Li_2S$, $Na_2S$, $K_2S$ and mixtures thereof.

39. The electrode of claim 1, wherein said at least one source of sulfur comprises S, and $Li_2S$, $Na_2S$, $K_2S$, or mixtures thereof.

40. The electrode of claim 1, wherein said at least one source of sulfur comprises S, and $Na_2S$.

41. The electrode of claim 1, wherein said basic composition comprises $NH_4OH$ at a concentration of about 0.1 M, S at a concentration of about 0.1 M, and $Na_2S$ at a concentration of about 0.1 M.

42. The electrode of claim 1, wherein said electrode is obtained by converting at least a portion of said $Co(OH)_2$ layer deposited on said first layer into CoS by dipping said layer of $Co(OH)_2$ within said basic composition over a period of time of about 5 minutes to about 60 minutes.

43. The electrode of claim 1, wherein said $Co(OH)_2$ layer deposited on said first layer is obtained by electrodepositing $Co(OH)_2$ on said first layer.

44. The electrode of claim 43, wherein electrodeposition is carried out by:
  i) using said polymer substrate having said indium tin oxide or a fluorine-doped $SnO_2$ layer thereon as a cathode and using a cobalt electrode as an anode;
  ii) inserting said cathode and said anode into a cell having therein a composition comprising a cobalt salt and a buffer; and
  iii) applying a galvanostatic current to the composition thereby forming said layer of $Co(OH)_2$ on said cathode.

45. The electrode of claim 44, wherein said composition in step (ii) has a pH of about 6.0 to about 7.5.

46. The electrode of claim 44, wherein said cobalt salt is selected from the group consisting of cobalt acetate, cobalt chloride, cobalt nitrate, cobalt sulphate and mixtures thereof.

47. The electrode of claim 44, wherein said current in step (iii) has a density of about 10 to about 15 $mA/cm^2$.

48. The electrode of claim 44, wherein the obtained electrode is suitable for use in a photovoltaic cell.

49. The electrode of claim 1, wherein the obtained electrode is flexible.

50. The electrode of claim 13, wherein said at least one source of sulfur is chosen from S, $Li_2S$, $Na_2S$, $K_2S$ and mixtures thereof.

51. The electrode of claim 13, wherein said basic composition comprises $NH_4OH$ at a concentration of about 0.1 M, S at a concentration of about 0.1 M, and $Na_2S$ at a concentration of about 0.1 M.

52. The electrode of claim 13, wherein said second layer comprising $Co(OH)_2$ and disposed on said first layer is obtained by electrodepositing $Co(OH)_2$ on said first layer.

53. The electrode of claim 13, wherein electrodeposition is carried out by:
  i) using said polymer substrate having said indium tin oxide or a fluorine-doped $SnO_2$ layer thereon as a cathode and using a cobalt electrode as an anode;
  ii) inserting said cathode and said anode into a cell having therein a composition comprising a cobalt salt and a buffer; and
  iii) applying a galvanostatic current to the composition thereby forming said layer of $Co(OH)_2$ on said cathode.

54. The electrode of claim 53, wherein said composition in step (ii) has a pH of about 6.0 to about 7.5.

55. The electrode of claim 53, wherein said current in step (iii) has a density of about 10 to about 15 $mA/cm^2$.

56. The electrode of claim 13, wherein the obtained electrode is flexible.

* * * * *

UNITED STATES PATENT AND TRADEMARK OFFICE
CERTIFICATE OF CORRECTION

PATENT NO. : 7,626,117 B2
APPLICATION NO. : 10/970982
DATED : December 1, 2009
INVENTOR(S) : Marsan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1121 days.

Signed and Sealed this

Second Day of November, 2010

David J. Kappos
*Director of the United States Patent and Trademark Office*